United States Patent
Jung et al.

(10) Patent No.: US 10,070,246 B2
(45) Date of Patent: Sep. 4, 2018

(54) ELECTRONIC DEVICE AND METHOD FOR TRANSMITTING INFORMATION

(71) Applicant: Samsung Electronics Co., Ltd., Gyeonggi-do (KR)

(72) Inventors: Bu-Seop Jung, Gyeonggi-do (KR); Young-Kwan Chung, Seoul (KR); Ki-Seok Kang, Gyeonggi-do (KR); Hyuk Kang, Gyeonggi-do (KR); Ju-Ho Kim, Gyeonggi-do (KR); Dong-Il Son, Gyeonggi-do (KR); Yong-Hae Choi, Gyeonggi-do (KR); In-Young Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/952,426

(22) Filed: Nov. 25, 2015

(65) Prior Publication Data
US 2016/0150357 A1   May 26, 2016

(30) Foreign Application Priority Data

Nov. 26, 2014 (KR) ........................ 10-2014-0166700

(51) Int. Cl.
*H04B 5/00* (2006.01)
*H04W 4/00* (2018.01)
(Continued)

(52) U.S. Cl.
CPC ............. *H04W 4/008* (2013.01); *H04W 4/80* (2018.02); *H04W 52/0206* (2013.01);
(Continued)

(58) Field of Classification Search
None
See application file for complete search history.

(56) References Cited

U.S. PATENT DOCUMENTS

2002/0028655 A1* 3/2002 Rosener ............... H04B 7/2606
455/16
2009/0221283 A1* 9/2009 Soliman ............... H04W 48/14
455/426.1
(Continued)

FOREIGN PATENT DOCUMENTS

| KR | 1020130097683 | 9/2013 |
|---|---|---|
| WO | WO 2008/024099 | 2/2008 |
| WO | WO 2013/048462 | 4/2013 |

OTHER PUBLICATIONS

European Search Report dated Apr. 21, 2016 issued in counterpart application No. 15196563.9-1505, 11 pages.

*Primary Examiner* — Mohammed Rachedine
(74) *Attorney, Agent, or Firm* — The Farrell Law Firm, P.C.

(57) ABSTRACT

An electronic device and a method of transmitting information in an electronic device a provided. The electronic device includes a communication unit that includes a first communication module and a second communication module, wherein the second communication module supports a low-power and short-range communication method; and a processor controls collection of information through the first communication module, and to transmit information related to the collected information through the second communication module.

31 Claims, 30 Drawing Sheets

(51) Int. Cl.
*H04W 52/02* (2009.01)
*H04W 4/80* (2018.01)
*H04W 76/14* (2018.01)
*H04W 88/06* (2009.01)

(52) U.S. Cl.
CPC ............ *H04W 76/14* (2018.02); *H04W 88/06* (2013.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/168* (2018.01); *Y02D 70/22* (2018.01); *Y02D 70/26* (2018.01)

(56) References Cited

U.S. PATENT DOCUMENTS

| | | | |
|---|---|---|---|
| 2010/0076670 A1* | 3/2010 | Turner | G06Q 30/0246 701/117 |
| 2013/0225197 A1 | 8/2013 | McGregor et al. | |
| 2014/0321317 A1* | 10/2014 | Kasslin | H04W 4/08 370/254 |
| 2015/0351022 A1* | 12/2015 | Sakoda | H04W 48/18 370/329 |

* cited by examiner

ELECTRONIC DEVICE AND METHOD FOR TRANSMITTING INFORMATION

PRIORITY

This application claims priority under 35 U.S.C. § 119(a) to Korean Patent Application Serial No. 10-2014-0166700, which was filed in the Korean Intellectual Property Office on Nov. 26, 2014, the entire content of which is incorporated herein by reference.

BACKGROUND

1. Field of the Disclosure

The present disclosure relates generally to low-power and short range communications, and more specifically, to an electronic device and a method for transmitting information in the electronic device.

2. Description of the Related Art

Various recent electronic devices are able to communicate with other electronic devices through a variety of communication methods.

For example, some electronic devices can communicate with other electronic devices located a short distance therefrom. Short-range communication methods, by which the electronic device may communicate with other electronic devices in a short range, may include Bluetooth, ZigBee, WiFi, near field communication (NFC), Bluetooth low energy (BLE), or the like.

An electronic device may transmit/receive information to/from other electronic devices within a short range of the electronic device by using the short-range communication methods.

When the electronic device that is able to perform the short-range communication enters a network, the electronic device may discover transmission signals (e.g., beacon signals and service discovery frame signals) that are generated from a wireless access point (AP), and may maintain a short-range communication state in order to share information. However, when the electronic device does not maintain the short-range communication state in order to reduce power consumption, the electronic device cannot receive the transmission signal, and the electronic device cannot share information through the short-range communication.

Further, since a wireless access point (AP), which generates a single beacon signal, transmits only the network information managed by the wireless access point through the beacon signal, for example, it is difficult to receive other network information through the wireless access point.

SUMMARY

The present disclosure has been made to address at least the above problems and/or disadvantages and to provide at least the advantages described below.

An aspect of the present disclosure provides an electronic device and a method for transmitting information in which the electronic device may collect one or more pieces of information from nearby electronic devices through a variety of communication methods, and may transmit the collected information through one or more low-power and short-range communication methods.

In accordance with an aspect of the present disclosure, an electronic device is provided. The electronic device includes a communication unit that includes a first communication module and a second communication module, wherein the second communication module supports a low-power and short-range communication method; and a processor controls collection of information through the first communication module, and to transmit information related to the collected information through the second communication module.

In accordance with another aspect of the present disclosure, a method of transmitting information in an electronic device is provided. The method includes collecting information through a first communication module; and transmitting information related to the collected information through a second communication module that supports a low-power and short-range communication method.

In accordance with another aspect of the present disclosure, a non-transitory computer-readable recording medium that records a program to be executed in computers wherein the program allows a processor to perform a method is provided. The method includes collecting information through the first communication module; and transmitting information related to the collected information through the second communication module that supports a low-power and short-range communication method.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
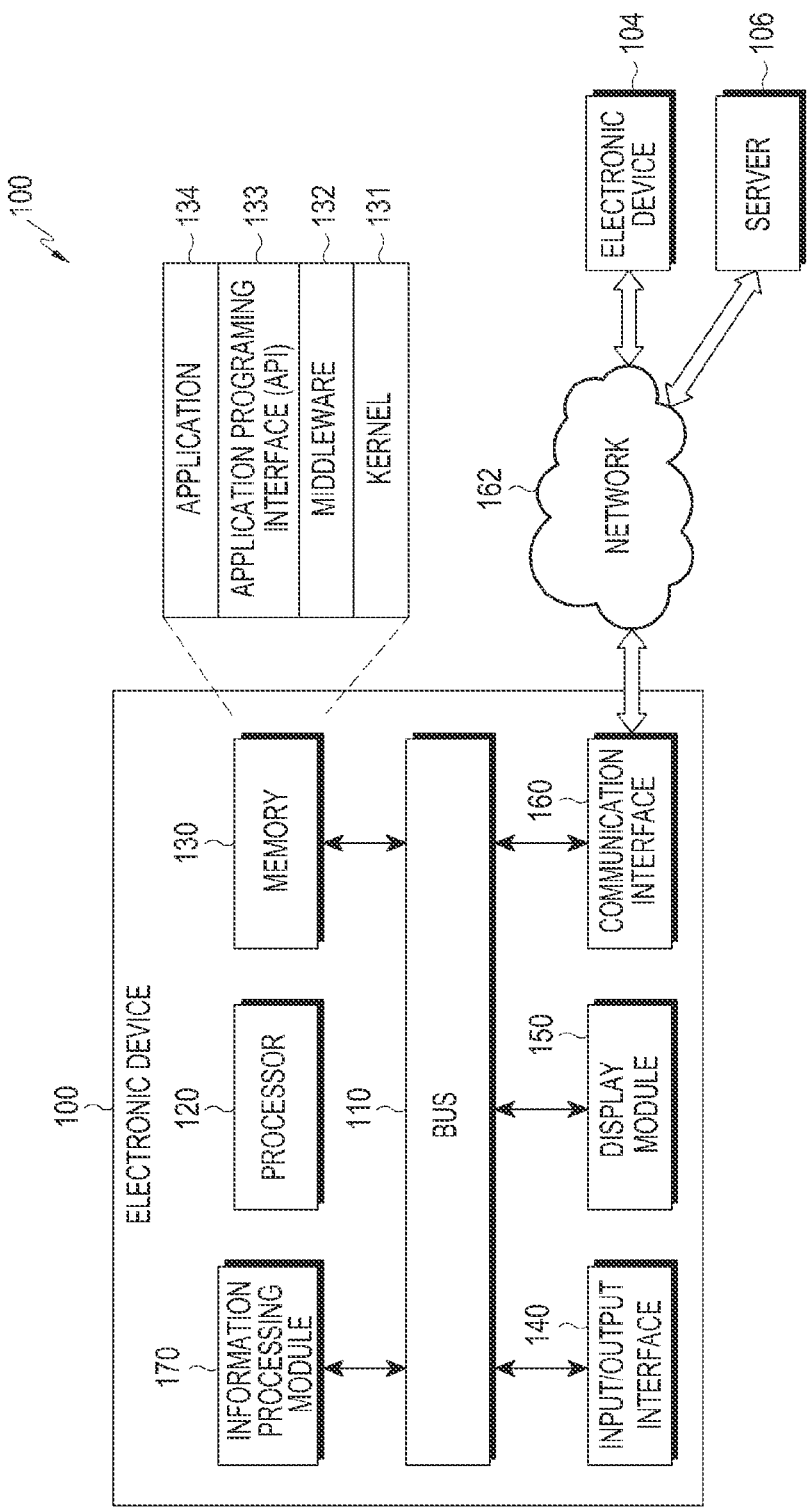
FIG. 1 is a diagram illustrating a network environment, according to various embodiments of the present disclosure.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. In the drawings, the same or similar reference numerals may be used to designate the same or similar constituent elements.

Herein, the expressions "include" and "may include" refer to the existence of a corresponding function, operation, or element, and do not exclude the existence of one or more additional functions, operations, or elements.

Herein, the expressions "A or B", "at least one of A or/and B", and "one or more of A or/and B" may include all possible combinations of the items listed. For example, the expression "A or B", "at least one of A and B", and "at least one of A or B" may include (1) at least one A, (2) at least one B, or (3) at least one A and at least one B.

The expression "a first", "a second", "the first", or "the second", as used herein, may modify various components, regardless of the order and/or the importance of these elements, but do not limit the corresponding components. The above expressions merely distinguish an element from other elements. For example, a first user device and a second user device indicate different user devices, although both are user devices. For example, a first element may be referred to as a second element, and similarly, a second element may be referred to as a first element, without departing from the scope of the present disclosure.

When an element (e.g., a first element) is referred to as being (operatively or communicatively) "connected," or "coupled," to another element (e.g., a second element), the element may be directly connected or coupled directly to the other element or any other element (e.g., a third element) may be interposer between them. By contrast, when an element (e.g., a first element) is referred to as being "directly connected," or "directly coupled" to another element (second element), there are no other elements (e.g., a third element) interposed between them.

As used herein, the expression "configured to" may be interchangeably used with any of the expressions "suitable for", "having the capability to", "designed to", "adapted to", "made to", and "capable of". The term "configured to" may not necessarily imply hardware "specifically designed to" perform a specified task. Alternatively, in some situations, the expression "device configured to" may mean that the device, together with other devices or components, "is able to" perform a specified task. For example, the phrase "a processor adapted (or configured) to perform A, B, and C" may refer to a dedicated processor (e.g. an embedded processor) only for performing the corresponding operations or a generic-purpose processor (e.g., central processing unit (CPU) or application processor (AP)) that can perform the corresponding operations by executing one or more software programs stored in a memory device.

The terms used herein are merely used to describe specific embodiments, and are not intended to limit the present disclosure. As used herein, singular forms may include plural forms as well unless the context clearly indicates otherwise.

Unless defined otherwise, all terms used herein, including technical and scientific terms, have the same definitions as those commonly understood by a person skilled in the art to which the present disclosure pertains. Terms such as those defined in a generally used dictionary may be interpreted to have the same definitions as the contextual definitions in the relevant field of art, and are not to be interpreted to have ideal or excessively formal definitions unless clearly defined in the present disclosure. In some cases, even terms defined herein are not be interpreted to in a manner that excludes embodiments of the present disclosure.

For example, an electronic device according to an embodiment of the present disclosure may be embodied as at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Motion Picture Experts Group (MPEG) Audio Layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

The electronic device may be embodied as a smart home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box, a game console, an electronic dictionary, an electronic key, a camcorder, and an electronic photo frame.

The electronic device may be embodied as, for example, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in a banking facility, point of sales (POS) device in a store, or an Internet of Things device (e.g., a light bulb, various sensors, electric or gas meter, a sprinkler device, a fire alarm, a thermostat, a streetlamp, a toaster, sporting goods, a hot water tank, a heater, a boiler, etc.).

The electronic device may be embodied as, for example, at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Herein, the term "user" may indicate a person using an electronic device or a device (e.g. an artificial intelligence of an electronic device) using an electronic device.

FIG. 1 is a diagram illustrating a network environment including an electronic device, according to various embodiments of the present disclosure.

Referring to FIG. 1, the network environment 100 includes the electronic device 101, which includes at least one of a bus 110, a processor 120, a memory 130, an input/output interface 140, a display module 150, a communication interface 160, or an information processing module 170. According to alternative embodiments of the present disclosure, the electronic device 101 may exclude at least one of the elements above, or may further include other additional elements.

The bus 110 may be a circuit for connecting elements described above with each other and transferring communication data (e.g., control messages) between the elements.

The processor 120, for example, may receive instructions from the above-mentioned elements (e.g., the memory 130, the input/output interface 140, the display module 150, the communication interface 160, or the information processing module 170) through the bus 110, and may decode the received instructions in order to thereby perform a calculation or data processing according to the decoded instructions. The processor 120 may process program instructions for executing various functions. For example, the processor 120 may be a single-threaded processor or a multi-threaded processor. Moreover, the processor 120 may process the instructions stored in the memory 130 or a storage device.

The memory 130 may store instructions or data received from the processor 120 or other elements (e.g., the input/output interface 140, the display module 150, the communication interface 160, or the information processing module 170), or that are created by the processor 120 or other elements. The memory 130 may include programming modules, such as, for example, a kernel 131, middleware 132, an application programming interface (API) 133, or applications 134. Each of the programming modules may be configured by software, firmware, hardware, or a combination thereof.

The kernel 131 may control or manage system resources (e.g., the bus 110, the processor 120, the memory 130, or the like) that are used in performing operations or functions implemented by other programming modules, such as the middleware 132, the API 133, or the applications 134. In addition, the kernel 131 may provide an interface by which the middleware 132, the API 133, or the applications 134 may access each element of the electronic device 101 for control or management.

The middleware 132 may play an intermediate role between the API 133 or the applications 134 and the kernel 131 to communicate with each other for the transmission and reception of data. Further, in relation to requests for operation received from the applications 134, the middleware 132 may control (e.g., scheduling or load-balancing) the requests, for example, by giving priority for using system resources (e.g., the bus 110, the processor 120, or the memory 130) of the electronic device 101 to at least one of the applications 134.

The API 133 is an interface by which the applications 134 control functions provided from the kernel 131 or the middleware 132, and the API 133 may include, for example, at least one interface or function (e.g., instructions) for file control, window control, image processing, or text control.

The applications 134 may include a short message service/multimedia messaging service (SMS/MMS) application, an email application, a calendar application, an alarm application, a health care application (e.g., an application for measuring an amount of exercise or blood sugar), an environmental information application (e.g., an application for providing information regarding atmospheric pressure, humidity, or temperature), or the like. Additionally or alternatively, the applications 134 may be applications related to an exchange of information between the electronic device 101 and other electronic devices (e.g., an external electronic device 104). The information-exchange-related application may include, for example, a notification relay application for relaying specific information to the other electronic devices, or a device management application for managing the other electronic devices.

For example, the notification relay application may include a function of transferring notification information created in other applications (e.g., the SMS/MMS application, the e-mail application, the health care application, or the environmental information application) of the electronic device 101 to the external electronic device 104. Additionally or alternatively, the notification relay application may receive notification information from, for example, the external electronic device 104 and may provide the same to a user. The device management application may manage (e.g., install, delete, or update), for example, at least some functions {e.g., turning the external electronic device 104 (or some elements of the external electronic device 104) on or off, or adjusting the brightness (or resolution) of a display} of the external electronic device 104, applications executed in the external electronic device 104, or services (e.g., a phone call service, or a messaging service) provided in the external electronic device 104.

The applications 134 may include applications that are designated according to the properties (e.g., the type of electronic device) of the external electronic device 104. For example, if the external electronic device 104 is an MP3 player, the applications 134 may include applications related to the reproduction of music. Likewise, if the external electronic device 104 is a mobile medical device, the applications 134 may include an application related to a health care. The application 134 may include at least one application designated in the electronic device 101 and/or at least one application received from external electronic devices (e.g., the server 106 or the electronic device 104).

The input/output interface 140 may transfer instructions or data input by the user through input/output devices (e.g., sensors, keyboards, or touch screens) to the processor 120, the memory 130, the communication interface 160, or the information processing module 170 through, for example, the bus 110. For example, the input/output interface 140 may provide data corresponding to a user's touch input through a touch screen to the processor 120. In addition, the input/output interface 140 may output, through the input/output devices (e.g., speakers or displays), the instructions or data received from the processor 120, the memory 130, the communication interface 160, or the information processing module 170 through the bus 110. For example, the input/output interface 140 may output voice data that is processed through the processor 120 to the user.

The display module 150 may display various pieces of information (e.g., multimedia data or text data) to the user. In addition, according to various embodiments of the present disclosure, the display module 150 may display, on a screen, an input window or an input pad for inputting various letters, symbols, or signs to the electronic device 101.

The communication interface 160 may perform a communication connection between the electronic device 101 and the electronic device 104 or the server 106). For example, the communication interface 160 may be connected to a network 162 through wireless communication or wired communication to thereby communicate with the external electronic device. The wireless communication may include at least one of Wi-Fi, Bluetooth (BT), near field communication (NFC), a global positioning system (GPS), or mobile communication (e.g., long term evolution (LTE), LTE-Advanced (LTE-A), code division multiple access (CDMA), wideband CDMA (WCDMA), universal mobile telecommunication system (UMTS), wireless broadband (WiBro), or global system for mobile communication (GSM)). The wired communication may include at least one of a universal serial bus (USB), a high definition multimedia interface (HDMI), recommended standard 232 (RS-232), or a plain old telephone service (POTS). In addition, the communication interface 160 may include well-known communication methods, or any type of communication method that will be developed later, as well as the communication methods described above.

The network 162 may include telecommunication networks. The telecommunication networks may include, for example, at least one of a computer network, the Internet, the Internet of Things (IoT), or a telephone network. Protocols (a transport layer protocol, a data link layer protocol, or a physical layer protocol) for communication between the electronic device 101 and external electronic devices may be supported by, for example, at least one of the applications 134, the API 133, the middleware 132, the kernel 131, or the communication interface 160.

Although the electronic device 101 is described as using the communication interface 160 to communicate with the external electronic device 104 or the server 106 through the network 120 in FIG. 1, according to an embodiment of the present disclosure, the electronic device 101 may be implemented to operate independently without a separate communication function.

The server 106 may execute one or more operations (or functions) that are implemented in the electronic device 101 in order to thereby support the operation of the electronic device 101. For example, the server 106 may include an information processing server module that can support the processor 120 implemented in the electronic device 101. For example, the information processing server module may include one or more elements of the information processing module 170 in order to thereby perform one or more operations (or functions) that are executed by the information processing module 170.

The information processing module 170 may process at least some of the information obtained from other elements (e.g., the processor 120, the memory 130, the input/output interface 140, or the communication interface 160), and may provide the same to the user in various manners.

Although the information processing module 170 is illustrated as separated from the processor 120 in FIG. 1, at least some of the information processing module 170 and/or its functions may be included in the processor 120, the memory 130, the input/output interface 140, the display module 150, the communication interface 160, or another processor.

The information processing module 170 may process at least some of the information obtained from the other elements (e.g., the processor 120, the memory 130, the input/output interface 140, or the communication interface 160), and may provide the processed information to the user in various manners. For example, the information processing module 170 may control at least some functions of the electronic device 101 such that the electronic device 101 interworks with the electronic device 104 or the server 106, by using the processor 120 or independently from the processor 120. The information processing module 170 is described in further detail herein below with reference to FIGS. 2 to 33.

Figure 2:
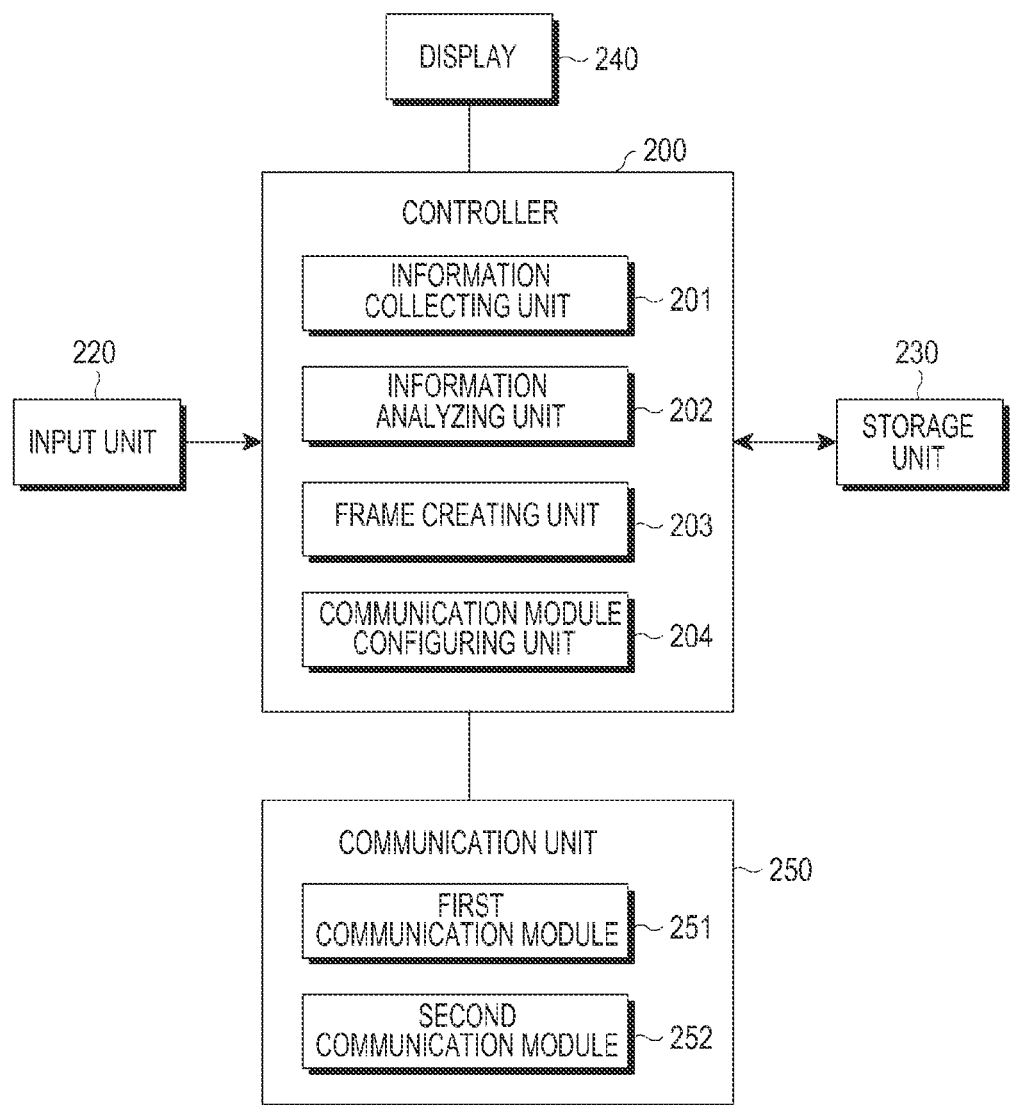
FIG. 2 is a block diagram illustrating an electronic device, according to various embodiments of the present disclosure.

FIG. 2 is a block diagram illustrating the information processing module of an electronic device, according to various embodiments of the present disclosure.

For convenience, in the following example, the information processing module 170 is described as operating within the processor 120. Furthermore, one or more elements of a controller 200 of FIG. 2 may be included in the information processing module 170 or the processor 120 of FIG. 1.

Referring to FIG. 2, the electronic device (e.g., the electronic device 101 of the FIG. 1) includes at least one of a controller 200, an input unit 220, a storage unit 230, a display 240, or a communication unit 250. According, to various embodiments of the present disclosure, the controller 200 includes at least one of an information collecting unit 201, an information analyzing unit 202, a frame creating unit 203, or a communication module configuring unit 204. The controller 200 may have an identical or similar configuration as the processor 120 shown in FIG. 1.

The information collecting unit 201 may collect one or more pieces of network information, peer to peer (P2P) information, service information, user input information, and/or connected device information of one or more servers or P2P devices through the first communication module 251, and may store the collected information in the storage unit 230. The information collected through the first communication module 251 will be referred to as first collected information hereinafter, for convenience. The first communication module 251 may include one or more communication modules in a wireless communication method (e.g., a short-range communication method), a mobile communication method, P2P communication method, and/or a wired communication method. The first communication module 251 may include one or more communication interfaces. In addition, the first communication module 251 may include a communication interface inside the electronic device in order to receive the information input by the user through the input/output interface 140 of FIG. 1.

The network information is provided by one or more access points {e.g., a wireless access point (AP) or a mobile communication base station} in the communication network, and may include at least one of, for example, a service set identifier (SSID), a channel list, channel load, the access point capability, access point location information, the type of network, network functions, network load, a data rate, local policy information, and/or network status information. The network information may also include one or more pieces of network-related information, which is provided by one or more service devices (e.g., a Hotspot 2.0 network server and/or an advertisement server) in another communication network that is connected with the access point in the network. Such network-related information on other networks may be the information that cannot be provided by the access point.

The P2P information may include one or more pieces of information provided by nearby electronic devices that are connected to the electronic device 101 according to a P2P method, and may include at least one of for example, device density, distribution of services that are currently used, device location, the device status, and/or P2P network-related information.

The service information may be provided by a connected service device, and may include at least one of for example, venue information, venue location, and/or venue service information (e.g., advertisements, events, discounts, purchase, and/or product information).

The connected device information may include one or more pieces of information provided by the connected device, and may include at least one of the connected device status, the type of service, the type of application, and/or location information.

The user input information may include one or more pieces of information directly input by the user, and may include at least one of information that is input by using a user manual input method, information that is input according to executed services or the operation of the application, user identification information, and/or authentication information.

The information collecting unit 201 may collect at least one of Global Positioning System (GPS) information, information that is measured by various sensors included in the electronic device, information related to services or applications, which are executed in the electronic device, and/or information stored in a storage medium of the electronic device, and may store the collected information in the storage unit 230. Herein, the collected information is referred to as second collected information for convenience.

The information collecting unit 201 may also periodically collect information according to a period that is configured in the electronic device. The information collecting period may be flexibly configured or may vary according to a state of the electronic device and the data collection, in addition to the configured period, or the information collecting period may be configured or may vary according to a user's request and executed services (or applications). The information collecting unit 201 may also collect information according to events. For example, the information collecting unit 201 may collect information when the user of the electronic device inputs a specific menu; related services (or applications) are executed, or when a sensor pattern and sensor information are changed according to sensor information. When the sensor pattern and sensor information are changed, the information collecting unit 201, for example, may collect information according to a location change detected by the GPS, or information according to movement detection by the acceleration sensor.

The details of the collection of one or more pieces of information in the information collecting unit 201 is described later herein.

The information analyzing unit 202 may analyze one or more pieces of information that is collected by the information collecting unit 201. In addition, the information analyzing unit 202 may analyze and/or process one or more pieces of the collected information. For example, the information analyzing unit 202 may process the information to be transmitted by adding one or more pieces of second collected information (e.g., location information estimated through the GPS) to the first collected information. For example, the information to be transmitted may relate to the collected information. The information analyzing unit 202 may filter one or more pieces of the collect information based on specific information (e.g., location information, sensor information, and/or received signal strength indicator (RSSI) information). The information analyzing unit 202 may process one or more pieces of the collected information according to a condition that is configured in the service (or application), which is in progress in the electronic device, or according to a condition configured by the user. The information analyzing unit 202 may process the information to be transmitted by adding information on the reception condition to one or more pieces of the collected information. The information analyzing unit 202 may configure a specific motion or sensor information as the reception condition, and may transmit one or more pieces of information that include the information on the reception condition. One or more nearby electronic devices, which have the same motion or sensor information, may receive one or more pieces of information transmitted by the electronic device.

In addition, the information analyzing unit 202 may process one or more pieces of the collected information in various manners as well as the above-described processing methods.

The frame creating unit 203 may configure a data frame that includes one or more pieces of information that are related to the collected information (i.e., one or more pieces of information that have been analyzed and/or processed in the information analyzing unit 202). The frame creating unit 203 may configure the data frame by assigning a service identifier (ID), and may assign different transmission identifiers (ID) for each communication interface in order to thereby configure the data frame. The frame creating unit 203 may assign different service identifiers (ID), based on network information, user input information, the type of service, transmission time information, or other information in order to thereby configure the data frame.

The communication module configuring unit 204 may configure the second communication module 252 in order to transmit one or more data frames that are configured by the frame creating unit 203 to one or more nearby electronic devices. The second communication module 252 may be a short-range communication module that supports low-power and short-range communication methods (e.g., at least one of a Bluetooth low energy (BLE) beacon, neighbor awareness networking (NAN), near field communication (NFC), or ZigBee compliant interfaces), and the communication method of the second communication module 252 may be different from the communication method of the first communication module 251. The second communication module 252 may include one or more low-power and short-range communication interfaces (e.g., at least one of a BLE beacon, NAN, NFC, or ZigBee compliant interfaces).

The communication module configuring unit 204 may include the data frame, which includes one or more pieces of the collected information or one or more pieces of the processed information, in a transmission signal (e.g., a beacon or service frame signal), and may transmit (e.g., broadcast) the same. The communication module configuring unit 204 may also be configured such that the same data frame may be transmitted (e.g., broadcast) through the low-power and short-range communication interfaces, which are included in the second communication module 252, via different communication methods.

In addition, the communication module configuring unit 204 may configure a plurality of low-power and short-range communication interfaces, such that different data frames may be transmitted according to at least one of a coverage, a region, time, the terminal status, the type of data, or priority, by using two or more short-range communication modules. The second communication module 252 (i.e., the low-power and short-range communication interfaces), may be configured in various manners as well as the above-described manners in order to transmit (e.g., broadcast) one or more created frames.

The communication module configuring unit 204 is described in further detail later herein.

The controller 200 may further include an execution unit for executing the operation of the electronic device 101. The execution unit may make a control to perform the operation in response to a user input or a sensed input. In addition the execution unit may control the display 240 to display the execution screen and display information according to the execution of the operation, or may control various operations (e.g., operations related to the generation of vibration, a sound output through speakers, or a camera module).

In addition, according to various embodiments of the present disclosure, at least some elements of the controller 200 may be included in the information processing module 170 shown in FIG. 1. In addition, according to various embodiments of the present disclosure, the controller 200 may be the processor 120 of FIG. 1 at least in part, and, for example, may include hardware, software, firmware, or a combination thereof.

In addition, according to various embodiments of the present disclosure, at least some of the controller 200 may include at least one of one or more processors 120 including a central processing unit (CPU)/micro processing unit (MPU), a memory 130 (e.g., a register and/or a random access memory (RAM)) that stores one or more pieces of memory-loaded data, and a bus 110 that inputs/outputs one or more pieces of data to the processor 120 and the memory 130, in terms of hardware. The controller 200 may also include a specific program routine or program data, which is loaded in the memory 130 from a predetermined recording medium and calculated and processed by the processor 120, in order to perform a software function defined in the electronic device.

The input unit 220 may transfer, to the controller 200, a variety of information, such as number and letter information, which are input by the user, and signals that are related to the function configuration and the function control of the electronic device. In addition, the input unit 220 may support the user's input in order to execute an application to support a specific function. The input unit 220 may include, for example, one or more of a key input device, such as a keyboard or a keypad, a touch input device, such as a touch sensor or a touch pad, a voice input device, various sensors, and/or cameras, and may further include a gesture input device. The input unit 220 may also include any of the input means that are currently under development or that could be developed in the future.

The input unit 220 may correspond to the input/output interface 140 of FIG. 1.

The storage unit 230 may temporarily store programs necessary for the functional operation and various pieces of data that are created during the execution of the programs. The storage unit 230 may include a program area and a data area. The program area may store information related to the operation of the electronic device, such as an operating system (OS) for booting the electronic device. The data area may store the transmitted and received data and the created data.

In addition, the storage unit 230 may correspond to the memory 130 of FIG. 1. The storage unit 230 may include, for example, at least one storage medium, such as a flash memory, a hard disk, memories in a multimedia card micro type (e.g., secure digital (SD) or extreme digital (XD) memory), a RAM, and/or a read-only memory (ROM).

The display 240 may display operation executing information and execution result information according to the operation control of the execution unit. The display 240 may display an execution screen for configuring the short-range communication module to transmit the data frame, and information on the configured short-range communication module. In addition, the display 240 may display an execution screen for analyzing and processing one or more pieces of the collected information. The display 240 may display one or more pieces of information that are analyzed from among network status information, service (or application) execution information, local venue information (e.g., advertisement information, event information, store information, and/or tour information), and/or status information of connected devices, by using the collected information. The display 240 may also display a list of executable applications, or may display the execution results of the configured applications.

The display 240 may correspond to the display module 150 of FIG. 1. When the display module 150 of the electronic device 101 is implemented in the form of a touch screen, the input unit 220 and/or the display 240 may correspond to the touch screen. When display 240 is implemented in the form of a touch screen together with the input unit 220, the display 240 may display a variety of information that is generated according to the user's touch operation.

The display 240 may include at least one of, for example, a liquid crystal display (LCD), a thin film transistor LCD (TFT-LCD), an organic LED (OLED), a light emitting diode (LED), an active matrix OLED (AMOLED), a flexible display, or a three-dimensional (3D) display. In addition, some of the above-described displays may be made in a transparent type or a translucent type so that the user can see through the display. Such a display may be configured in the form of a transparent display including a transparent OLED (TOLED).

The communication unit 250 includes the first communication module 251 and the second communication module 252. The first communication module 251 may include one or more communication modules that support at least one of mobile communication, P2P communication, UPS communication, or wireless communication (including short-range communication). Furthermore, the first communication module 251 may include communication modules that support a variety of communication methods, and may include all communication modules that are currently under development or could be developed in the future. The second communication module 252 may support one or more low-power and short-range communication methods, and may be different from the first communication module 251. For example, the low-power and short-range communication method may include at least one of a BLE beacon, neighbor awareness networking (NAN), NFC, and/or ZigBee.

The communication unit 250 may also transmit, to the nearby electronic devices, the data frame that includes one or more pieces of information related to the information collected through the first communication module 251, under the control of the controller 200. When the communication unit 250 receives a signal including one or more pieces of information through the first communication module 251, the communication unit 250 may forward one or more pieces of the information included in the received signal to the information collecting unit 201 of the controller 200.

The communication unit 250 may correspond to some of the functions for the data transmission and reception processing of the processor 120 of FIG. 1, or may correspond to the communication interface 170 of FIG. 1.

Elements of the electronic device 101 (e.g., the information processing module 170 of FIG. 1) have been described with reference to FIG. 2. However, not all of the elements described in FIG. 2 are essential elements of the present disclosure, and the electronic device (e.g., the electronic device 101 of FIG. 2) may be implemented by fewer elements than the illustrated elements, or may include additional new elements. For example, the information processing module 170 of the electronic device 101 may include a sound source output unit that converts the electrical signal of a sound source to an analog signal to then be output.

The locations of the elements of the electronic device 101 of FIG. 2 may vary for convenience, or for other reasons. The elements of the controller 200 are not limited to the elements shown in FIG. 2, and may further include various elements that perform various functions.

According to one of the various embodiments of the present disclosure, an electronic device may include a communication unit that includes a first communication module and a second communication module that supports a low-power and short-range communication method; and a processor that makes a control to collect one or more pieces of information through the first communication module, and to transmit one or more pieces of information related to the collected information through the second communication module.

The low-power and short-range communication method may be at least one of for example, a BLE beacon, NAN, NFC (near field communication), and ZigBee.

The first communication module may support at least one of, for example, a short-range communication method, a mobile communication method, a P2P communication method, a device access method, or a user input method.

The processor may additionally collect at least one piece of information stored in a storage medium of the electronic device, information measured in the electronic device, running service information of the electronic device, running application information of the electronic device, or information that is collected according to a predetermined condition.

The processor may configure a plurality of data frames that include one or more pieces of information related to the collected information, and the configured data frames may be transmitted through the one or more second communication modules while including different service identifiers.

The processor may configure a plurality of data frames that include one or more pieces of information related to the collected information, and the configured data frames may be assigned with the same service identifier, may relate to each other, and may be transmitted through different low-power and short-range communication interfaces included in the second communication module.

The processor may differently configure data frames, which have one or more pieces of information related to the collected information, depending on at least one of hierarchical modulation, frequency, distance, or low-power and short-range communication methods, and the configured data frames are transmitted through the second communication module.

The processor may configure a data frame that includes one or more pieces of information related to the collected information, and may differently configure the data frame according to ambient conditions of the electronic device, time, place, or a specific condition, and the configured data frame may be transmitted through the second communication module.

The processor may separate the collected information for each sector, and one or more pieces of the information that is separated for each sector may be transmitted through the second communication module.

The processor may limit one or more sectors in which networks exist by adjusting a signal transmission direction, and may transmit one or more pieces of information corresponding to the one or more limited sectors through the second communication module.

If the first communication module supports a short-range communication method, the processor may collect one or more pieces of network information provided by a wireless access point, may analyze and process the collected network information, and may transmit one or more pieces of the analyzed and processed information through the second communication module.

If the first communication module is a communication module in order to be connected with one or more service devices, the processor may collect one or more pieces of venue information and service information provided by one or more connected service devices, may analyze and process one or more pieces of the collected venue information and service information, and may transmit one or more pieces of the analyzed and processed information through the second communication module.

If the first communication module supports communication between a plurality of electronic devices, the processor may collect one or more pieces of information from among network-related information, device status information, or device location information, which are provided by other electronic devices, may process one or more pieces of the collected information, and may transmit one or more pieces of the processed information through the second communication module, and one or more pieces of the processed information may include at least one piece of information for the location estimation of the other electronic devices and network correction information.

If the first communication module supports a mobile communication method, the processor may collect one or more pieces of network-related information provided by a mobile communication access point, may analyze and process one or more pieces of the collected information, and may transmit one or more pieces of the analyzed and processed information through the second communication module, and one or more pieces of the analyzed and processed information may include at least one of recommended network-related information or policy information.

According to an embodiment of the present disclosure, if the first communication module supports a P2P communication method, the processor may collect one or more pieces of information provide by one or more nearby electronic devices that are connected through the first communication module, may analyze the collected information, and may transmit one or more pieces of nearby electronic device-related information through the second communication module.

The processor, when another electronic device that has received the transmitted information requests additional information, may transmit the additional information received from the connected nearby electronic devices to another electronic device through the first communication module.

The processor may: analyzes the collected information; registers one or more pieces of the analyzed information in a service device that is connected through the first communication module; and receives one or more pieces of the analyzed information by using the information registered in the service device through the first communication module.

The processor may receive, through the second communication module, one or more pieces of feedback for the information that has been transmitted through the second communication module.

Hereinafter, short-range service methods of the electronic device, according to various embodiments of the present disclosure, are described in detail with reference to the accompanying drawings.

Figure 3:
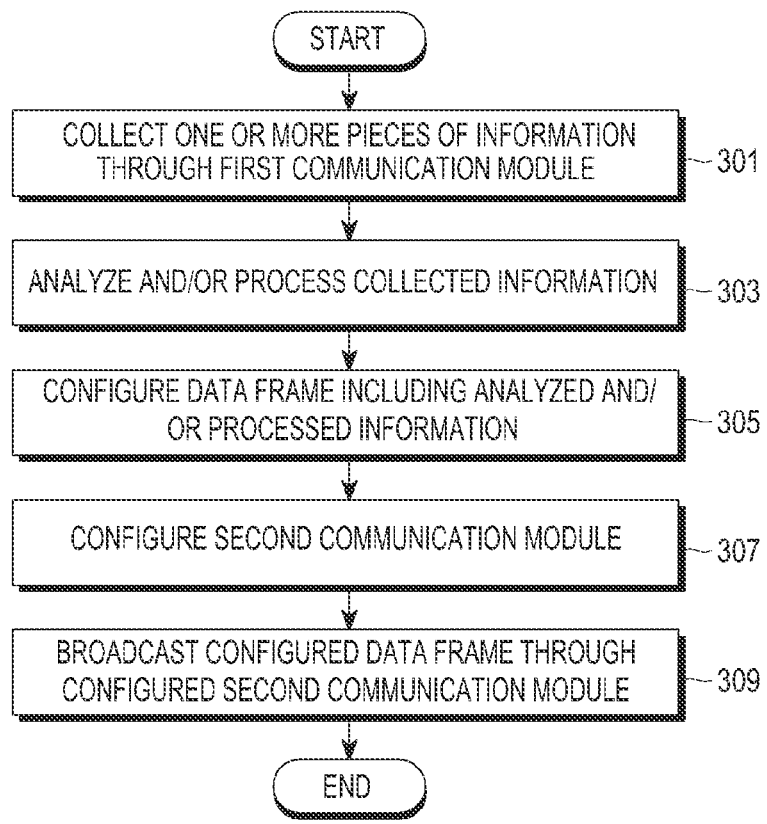
FIG. 3 is a flowchart illustrating the operation of an electronic device, according to various embodiments of the present disclosure.

FIG. 3 is a flowchart of the operation of the electronic device, according to various embodiments of the present disclosure.

Referring to FIG. 3, in operation 301, the electronic device (e.g., the electronic device 101 of FIG. 1 or the electronic device of FIG. 2), collects one or more pieces of first information through the first communication module (e.g., the first communication module 251 of FIG. 2), and stores the collected information in the storage unit (e.g., the storage unit 230 of FIG. 2). The electronic device may also collect one or more pieces of second information from among information stored in the storage medium of the electronic device, information measured in the electronic device (e.g., information measured by the GPS or various sensors), or information on services or applications that are executed in the electronic device.

In operation 303, the electronic device analyzes and/or processes one or more pieces of the collected information. The electronic device may process the collected information by adding one or more pieces of the second information to one or more pieces of the first collected information. The electronic device may transmit the collected information to the nearby electronic devices without processing the collected information, or may identify network information of the collected and stored information and may process the collected information by adding the collected location information to the identified network information.

Figure 4:
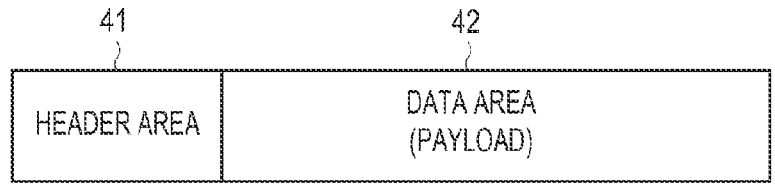
FIG. 4 is a diagram illustrating a data frame transmitted by an electronic device, according to various embodiments of the present disclosure.

In operation 305, the electronic device configures a data frame that includes one or more pieces of information that are related to the collected information, that is, one or more pieces of information that have been analyzed and/or processed. The electronic device may configure the data frame to include a service identifier (ID). The electronic device may assign two or more service IDs according to the type of low-power and short-range communication interface of the second communication module, and may configure the data frame for each of the assigned service IDs. The data frame may be configured to include a header 41 and a payload 42, as shown in FIG. 4. The header 41 may include brief information on the data frame, such as a transmission identifier, or its own address information, and the payload 42 may include one or more pieces of information to be transmitted.

Next, in operation 307, the electronic device configures the second communication module in order to transmit the configured data frame to the nearby electronic devices. The electronic device may configure the type of low-power and short-range communication interface included in the second communication module. When the electronic device transmits the configured data frame through a plurality of low-power and short-range communication interfaces, the electronic device, for example, may configure a BLE beacon interface or a NAN interface to maintain an on-state, and may simultaneously or separately transmit one or more data frames through the two configured communication interfaces.

In operation 309, the electronic device transmits (e.g., broadcasts) the data frame including one or more pieces of information that are related to the collected information through one or more of the configured low-power and short-range communication interfaces.

One or more of the operations shown in FIG. 3 may be omitted, and/or one or more other additional operations may be added between the operations shown in FIG. 3. In addition, the operations shown in FIG. 3 may be performed in the order shown in FIG. 3, or an order between at least two operations may be changed.

According to one of various embodiments of the present disclosure, a method of transmitting information in an electronic device may include collecting one or more pieces of information through a first communication module; and transmitting one or more pieces of information related to the collected information through a second communication module that supports a low-power and short-range communication method.

The low-power and short-range communication method may be at least one of a BLE beacon, NAN (neighbor awareness networking), NFC (near field communication), or ZigBee.

The method may further include analyzing the information collected through the first communication module by using at least one piece of information stored in a storage medium of the electronic device, information measured in the electronic device, running service information of the electronic device, running application information of the electronic device, or information that is collected according to a predetermined condition; configuring one or more data frames that include one or more pieces of information related to the collected information according to the analysis result; and configuring the second communication module according to the configured data frames.

The operation of collecting one or more pieces of information through the first communication module may include collecting one or more pieces of information through the first communication module by using at least one of a short-range communication method, a mobile communication method, a P2P (peer to peer) communication method, a device access method or a user input method.

The operation of collecting one or more pieces of information through the first communication module may include collecting at least one piece of information stored in a storage medium of the electronic device, information measured in the electronic device, running service information of the electronic device, running application information of the electronic device, or information that is collected according to a predetermined condition.

The operation of transmitting one or more pieces of information related to one or more pieces of the collected information through the second communication module may include transmitting one or more pieces of information that is differently configured according to at least one of hierarchical modulation, frequency, distance, or low-power and short-range communication methods.

The operation of transmitting one or more pieces of information related to one or more pieces of the collected information through the second communication module may include transmitting one or more pieces of information that are differently configured according to ambient conditions of the electronic device, time, place, or a specific condition through the second communication module.

The operation of transmitting one or more pieces of information related to one or more pieces of the collected information through the second communication module may include separating one or more pieces of information related to the collected information for each sector, and transmitting the same through the second communication module.

The operation of transmitting one or more pieces of information related to one or more pieces of the collected information through the second communication module may include limiting one or more sectors in which networks exist by adjusting a signal transmission direction, and transmitting one or more pieces of information related to the collected information corresponding to the one or more limited sectors through the second communication module.

The operation of transmitting one or more pieces of information related to one or more pieces of the collected information through the second communication module may include transmitting a plurality of data frames, which are configured by adding service identifiers and synchronization information to one or more pieces of information related to the collected information, in different low-power and short-range communication methods.

The method may further include, when another electronic device that has received the transmitted information requests additional information, transmitting the additional information received from the connected nearby P2P device to another electronic device through the first communication module.

The method may further include analyzing the collected information; registering one or more pieces of the analyzed information in a service device that is connected through the first communication module, and receiving one or more pieces of the analyzed information by using the information registered in the service device through the first communication module.

The method may further include receiving, through the second communication module, one or more pieces of feedback for the information that has been transmitted through the second communication module.

Hereinafter, an embodiment of the present disclosure is described in detail based on the configuration and operation of the electronic device (e.g., the electronic device 101 of FIG. 1 or the electronic device of FIG. 2) as described above. For convenience, the electronic device that collects information through the first communication module (e.g., the first communication module 251 of FIG. 2) shall be referred to as a first electronic device, and the nearby electronic device that receives the information transmitted from the first electronic device through the second communication module (e.g., the first communication module 252 of FIG. 2) shall be referred to as a second electronic device. Furthermore, the electronic device that is connected with the first electronic device through the P2P communication shall be referred to as a third electronic device.

Figure 5:
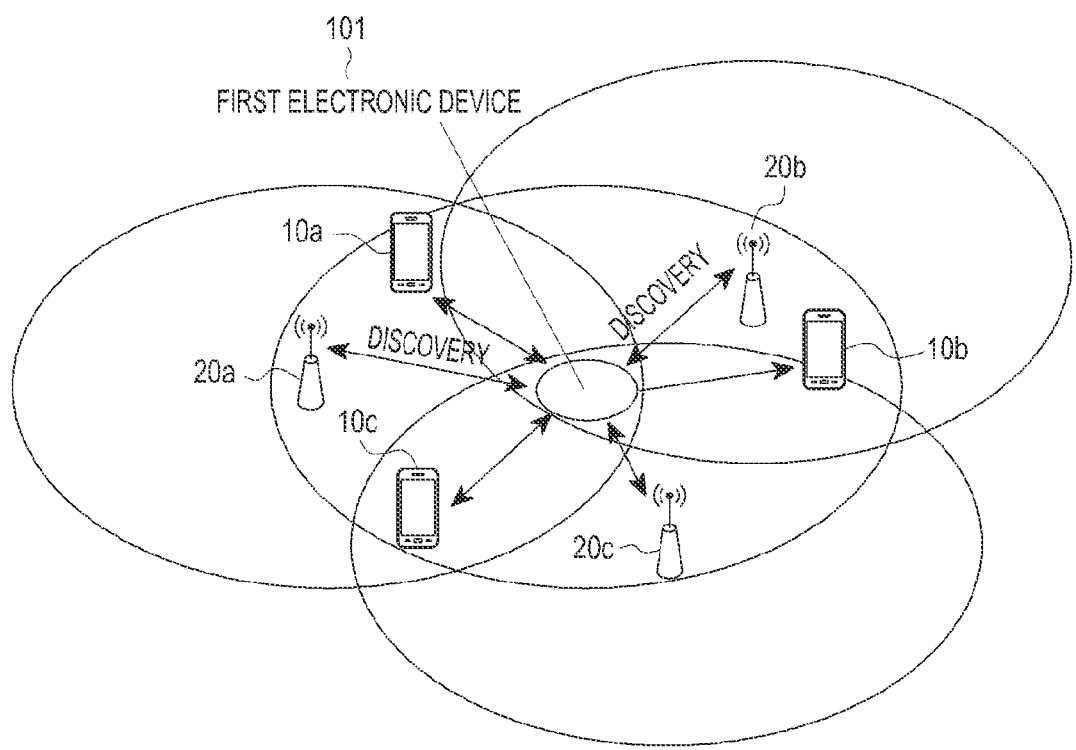
FIG. 5 is a diagram illustrating a wireless network system using an electronic device, according to various embodiments of the present disclosure.

FIG. 5 is a diagram illustrating a wireless network system using an electronic device, according to various embodiments of the present disclosure.

Referring to FIG. 5, in the wireless network system, the first electronic device 101 may collect one or more pieces of information that are provided from the wireless access points (APs) through the first communication module. The first communication module, for example, may be a short-range wireless communication module.

The first electronic device 101 may collect one or more pieces of information through at least one of for example, a discovery operation defined in the communication standard, or 802.11k.

The first electronic device 101 or one or more of the second electronic devices 10a, 10b, and/or 10c may support a wireless network, e.g., a short-range communication method, and may receive signals transmitted from one or more wireless access points 20a, 20b, and 20c in the wireless network. The first electronic device 101 may collect one or more pieces of information that are provided from the one or more wireless access points 20a, 20b and/or 20c through the received signals. The collected information may include at least one of, for example, a service set identifier (SSID), a channel list, channel load, the access point capability, access point location information, the type of network, network functions, network load, a data rate, local policy information, and/or network status information.

Figure 6:
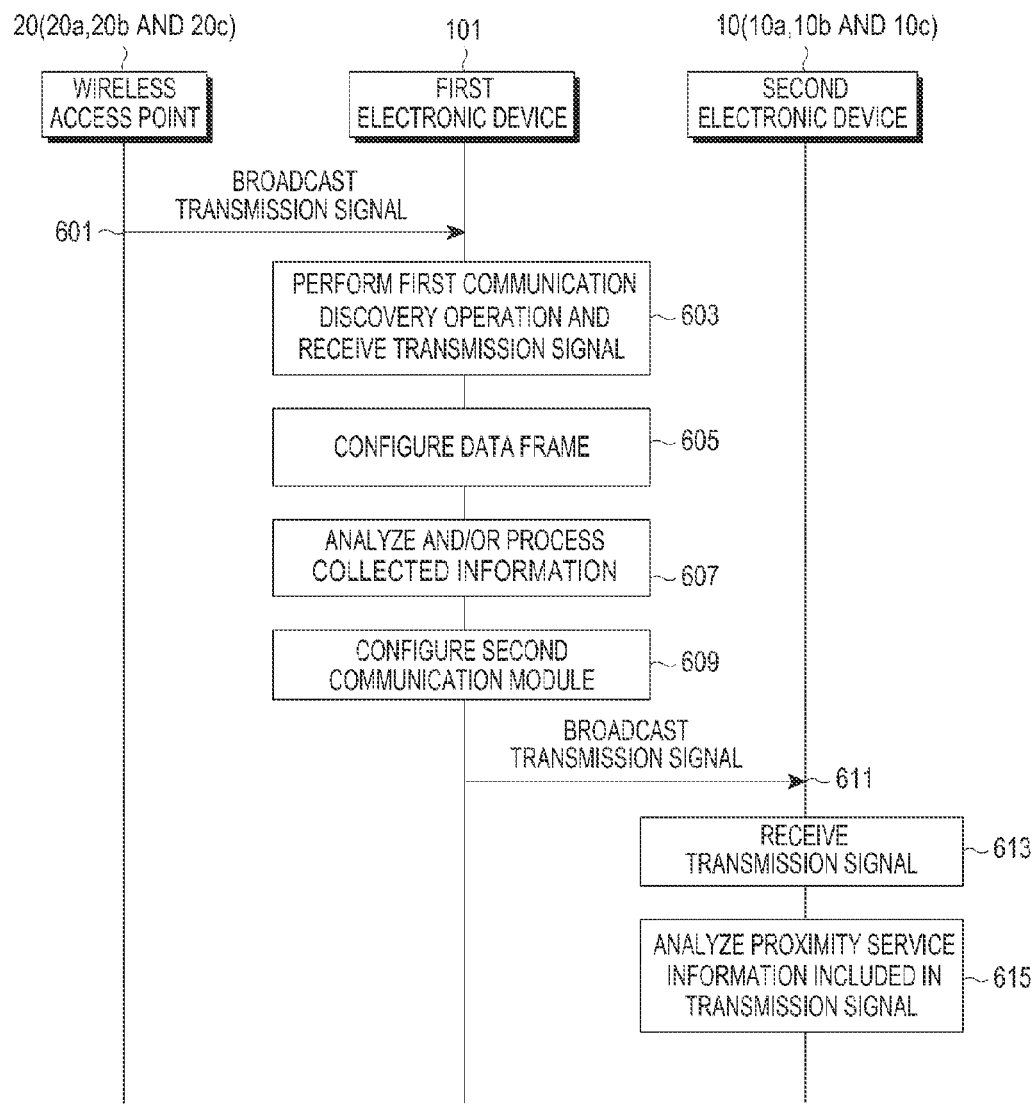
FIG. 6 is a diagram illustrating a signal processing flow in a wireless network system using an electronic device, according to various embodiments of the present disclosure.

FIG. 6 is a diagram illustrating a signal processing flow in a wireless network system using an electronic device, according to various embodiments of the present disclosure.

Referring to FIG. 6, in step 601, one or more wireless access points 20 (20a, 20b, and 20c) transmit a discovery signal periodically or aperiodically. The first electronic device 101 configures the first communication module (e.g., a short-range communication module) to be in the on-state in order to thereby discover transmission signals transmitted by one or more wireless access points 20. In accordance with the discovery operation above, the step 603, the first electronic device 101 receives the transmission signals transmitted from the one or more wireless access points 20.

Meanwhile, although not shown in FIG. 6, the first electronic device 101, for example, may receive profile information of the first electronic device 101 through the connection operation with the electronic device 101, and may be connected to the first electronic device 101 after an authentication process instead of performing an active discovery, i.e., the short-range communication discovery operation. Afterwards, the first electronic device 101 may transmit a request signal for information to the one or more wireless access points 20 according to the passive discovery operation, and may receive one or more pieces of information in response thereto. Furthermore, the first electronic device 101 may collect one or more pieces of information through a variety of collecting methods.

In operation 605, the first electronic device 101 collects one or more pieces of information included in the transmission signals, and stores the collected information in the storage unit 230 in order to thereby analyze and/or process the collected information.

In operation 607, the first electronic device 101 configures a data frame that includes one or more pieces of the information that have been analyzed and/or processed.

In operation 609, the first electronic device 101 configures the second communication module (e.g., at least one of a BLE beacon, NFC, ZigBee, and/or NAN) to be in the on-state, and configures, as interfaces, one or more different low-power and short-range communication interfaces for the information transmission.

In operation 611, the first electronic device 101 transmits a transmission signal that includes the configured data frame through the configured second communication module (i.e., the one or more low-power and short-range communication interfaces). The transmission signal, for example, may be a low-power and short-range transmission signal.

In operation 613, the second electronic devices 10 (10a, 10b and 10c) receives the transmission signal through a low-power and short-range communication discovery operation when the first communication module (e.g., the short-range communication module) is in the off-state and in a low-power and short-range communication standby mode. In operation 615, the one or more second electronic devices 10 analyze one or more pieces of information included in the received transmission signal.

When the one or more second electronic devices 10 are required to connect with a wireless network (e.g., the first communication network), in order to obtain additional information, the second electronic devices may configure the first communication module to be in the on-state, and may perform an access procedure with respect to one or more wireless access points 20.

In the signal processing operation in the wireless network system by using the first electronic device 101 as described above, the one or more second electronic devices 10 may compare one or more pieces of the received information with pre-stored profile information. In addition, when the short-range communication module of the one or more second electronic devices 10 is in the off-state, the one or more second electronic devices 10 may configure one or more low-power and short-range communication interfaces, such as a BLE beacon, NFC, ZigBee, and/or NAN, to be in the on-state in order to always maintain a mode for discovering the low-power and short-range transmission signal (a low-power and short-range communication stand mode). The one or more second electronic devices 10 may notify the user of one or more pieces of the received information. The one or more second electronic devices 10 may output a notification of one or more pieces of information through one or more icons, LED light, sound, vibration, a user interface (UI), or available networks.

Even if the first communication modules (e.g., the short-range communication module) of the one or more second electronic devices 10 are in the off-state, if the low-power and short-range communication module is in the standby mode, the second electronic device 10 may receive one or more pieces of information related to the information collected in the first electronic device 101, and may selectively trigger a Wi-Fi operation. The one or more second electronic devices 10 may minimize unnecessary discovery operations by using one or more pieces of the received information. For example, the one or more second electronic devices 10 may simplify the scan channel by using channel list information, and may select the best network by using load information.

Figure 7:
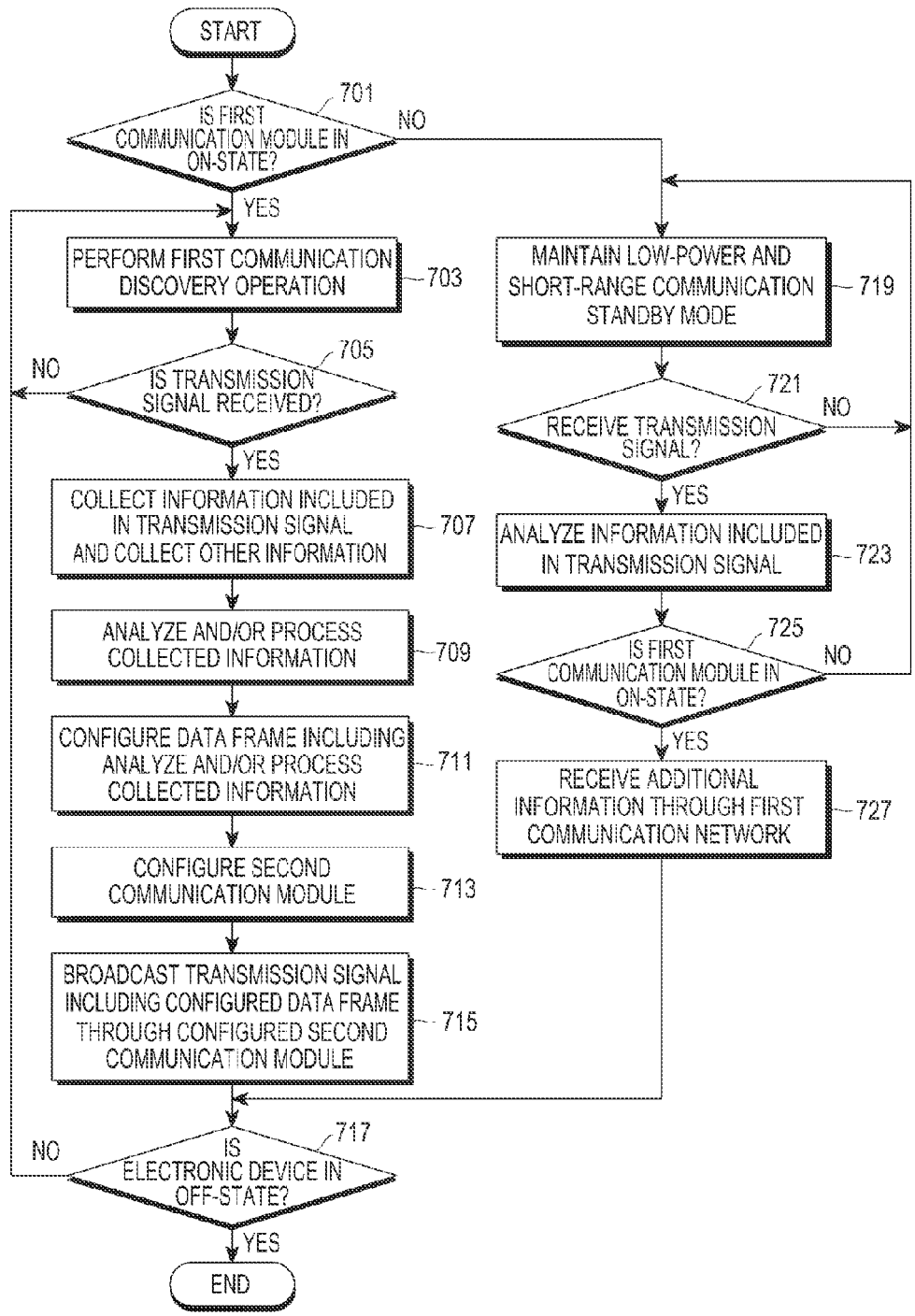
FIG. 7 is a flowchart illustrating the operation of an electronic device in a wireless network system using the electronic device, according to various embodiments of the present disclosure.

FIG. 7 is a flowchart illustrating the operation of the electronic device in the wireless network system using the electronic device, according to various embodiments of the present disclosure. Referring to FIG. 7, in operation 701, the first electronic device 101 checks whether the first communication module (e.g., the short-range communication module) is in the on-state. If the first communication module is not in the on-state, the first electronic device performs operation 719.

If the first communication module is in the on-state, in operation 703, the first electronic device 101 performs the first communication (e.g., the short-range communication) discovery operation in order to receive the transmission signal that is periodically or aperiodically transmitted from one or more wireless access points 20.

In operation 705, the first electronic device 101 identifies whether the transmission signal is received. If the transmission signal is not received, the first electronic device 101 performs operation 703.

If the transmission signal is received, in operation 707, the first electronic device 101 collects one or more pieces of information (e.g., at least one of a service set identifier (SSID), a channel list, network capability, network load, and/or location information), which are included in the one or more transmission signals that are discovered.

In operation 709, the first electronic device 101 analyzes and/or processes one or more pieces of the collected information. The first electronic device 101 may analyze network-related information from one or more pieces of the collected information in order to thereby notify the user of a channel list, or in order to select the best network by using the network capability and load information. The first electronic device 101 may add one or more pieces of the second information (e.g., one or more pieces of location information, sensor information, or received signal strength indicator (RSSI) information), which are collected from one or more of a GPS, various sensors, a storage medium, or executed services (or applications), to one or more pieces of the information (the first information) that are collected through the first communication module. The first electronic device 101 may also filter out unnecessary information from one or more pieces of the collected information in order to thereby process one or more pieces of information to be transmitted. The second electronic device 10 may identify the location of the first electronic device 101 by using one or more pieces of the transmitted information. Since the first electronic device 101 filters unnecessary information, the second electronic device 10 does not receive the unnecessary information, to thereby reduce the load of the information transmission and reception.

In operation 711, the first electronic device 101 configures one or more data frames that include one or more pieces of information that have been analyzed and/or processed. When transmitting a single data frame, the first electronic device 101 may configure one or more low-power and short-range communication interfaces to be in the on-state. When transmitting a plurality of data frames that are distinguished from each other by different service identifiers, the first electronic device 101 may configure a plurality of tow-power and short-range communication interfaces (e.g., NAN, a BLE beacon, NFC, and/or ZigBee) to be in the on-state in order to transmit different data frames. The first electronic device 101 may configure such that two or more data frames, which are distinguished by different service IDs, are transmitted in sequence through a single low-power and short-range communication interface. The data frame may be configured in various manners, and other embodiments applicable to the data frame are described herein below.

In operation 713, the first electronic device 101 configures the second communication module for transmitting the one or more configured data frames. The first electronic device 101 may configure one or more low-power and short-range communication interfaces included in the second communication module to be in the on-state in order for the second electronic device 10 to receive a low-power and short-range transmission signal even when the short-range communication module of the second electronic device 10 is in the off-state.

In operation 715, the first electronic device 101 transmits one or more configured data frames through the configured second communication module (one or more low-power and short-range communication interfaces).

In operation 717, if the first electronic device 101 is in the off-state, the sequence ends, otherwise, operation 703 is repeated.

In operation 719, since the first communication module is in the off-state, the first electronic device 101 may maintain the low-power and short-range communication standby mode. The first electronic device 101 may play the same role as the second electronic device 10, which is a receiving electronic device for receiving one or more pieces of the collected information. The second electronic device 10 may perform operations 719, 721, 723, 725, and 727 in the same manner as corresponding operations are performed with respect to the first electronic device 101.

The first electronic device 101 may maintain the standby mode and discover the low-power and short-range communication. In operation 721, the first electronic device 101 checks whether a low-power transmission signal is received through the low-power and short-range communication discovery operation.

As a result of the check, if the transmission signal is not received, the first electronic device 101 performs operation 719, and if the transmission signal is received, the first electronic device 101 performs operation 723.

In operation 723, the first electronic device 101 may analyze one or more pieces of the information included in the received transmission signal.

The first electronic device 101 may check whether the first communication module is in the on-state. As a result of the check, if the first communication module is not in the on-state, the first electronic device 101 repeats operation 719. Otherwise, the first electronic device 101 performs operation 727. In operation 727, the first electronic device 101 connects to the first communication network in order to thereby receive additional information through the first communication network. After step 727 is performed, the first electronic device 101 may perform step 717.

Figure 8:
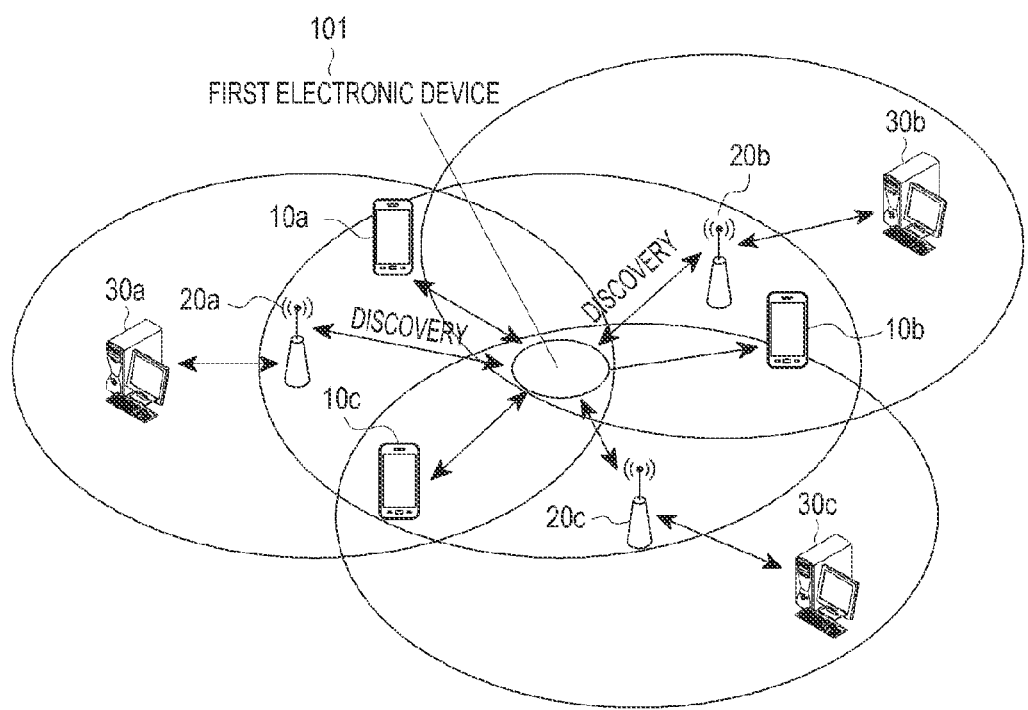
FIG. 8 is a diagram illustrating a wireless network system using an electronic device, according to various embodiments of the present disclosure.

FIG. 8 is a diagram illustrating a wireless network system using the electronic device, according to various embodiments of the present disclosure. Referring to FIG. 8, the first electronic device 101 may be applied to wireless network systems according to various embodiments of the present disclosure. In the wireless network system using the first electronic device 101, the first electronic device 101 may collect one or more pieces of information in an environment that supports a wireless network, such as an 802.11u-network.

The first electronic device 101, for example, may transmit and receive signals through wireless access points 20a, 20b, and 20c that play the same role as a base station in the 802.11u-network. The 802.11u-network system includes service devices 30a, 30b, and 30c that provide one or more pieces of information, which cannot be provided by the wireless access points 20a, 20b, and 20c.

The first electronic device 101 in the 802.11u-network system may perform a network discovery (802.11u discovery, scan) operation; receive a transmission signal that is received through the network discovery operation; and collect one or more pieces of information included in the received transmission signal, which is provided by the one or more service devices 30a, 30b, and 30c. One or more pieces of the collected information, which is network-related information and service information, may include at least one of, for example, operator identifier (ID) (e.g., a public land mobile network (PLMN), domain, or realm) information, which provides the Hotspot 2.0 network, or current venue identifier (ID) and/or service information (e.g., at least one of notification, advertisement, events, or purchase information). The collected information may be the information that cannot be provided by the wireless access points 20a, 20b and/or 20c. The 802.11u-network system, for example, may be applied to the Hotspot 2.0, and the first electronic device 101 may be automatically connected to the WiFi network based on the Hotspot 2.0 in order to thereby receive one or more pieces of information provided from the service devices 30a, 30b, and 30c.

The first electronic device 101 may collect one or more pieces of information that includes external network information that is received through the 802.11u-network, and may transmit (e.g., broadcast) a transmission signal including one or more pieces of the collected information to the second electronic devices 10a, 10b and 10c through the configured second communication module.

Figure 9:
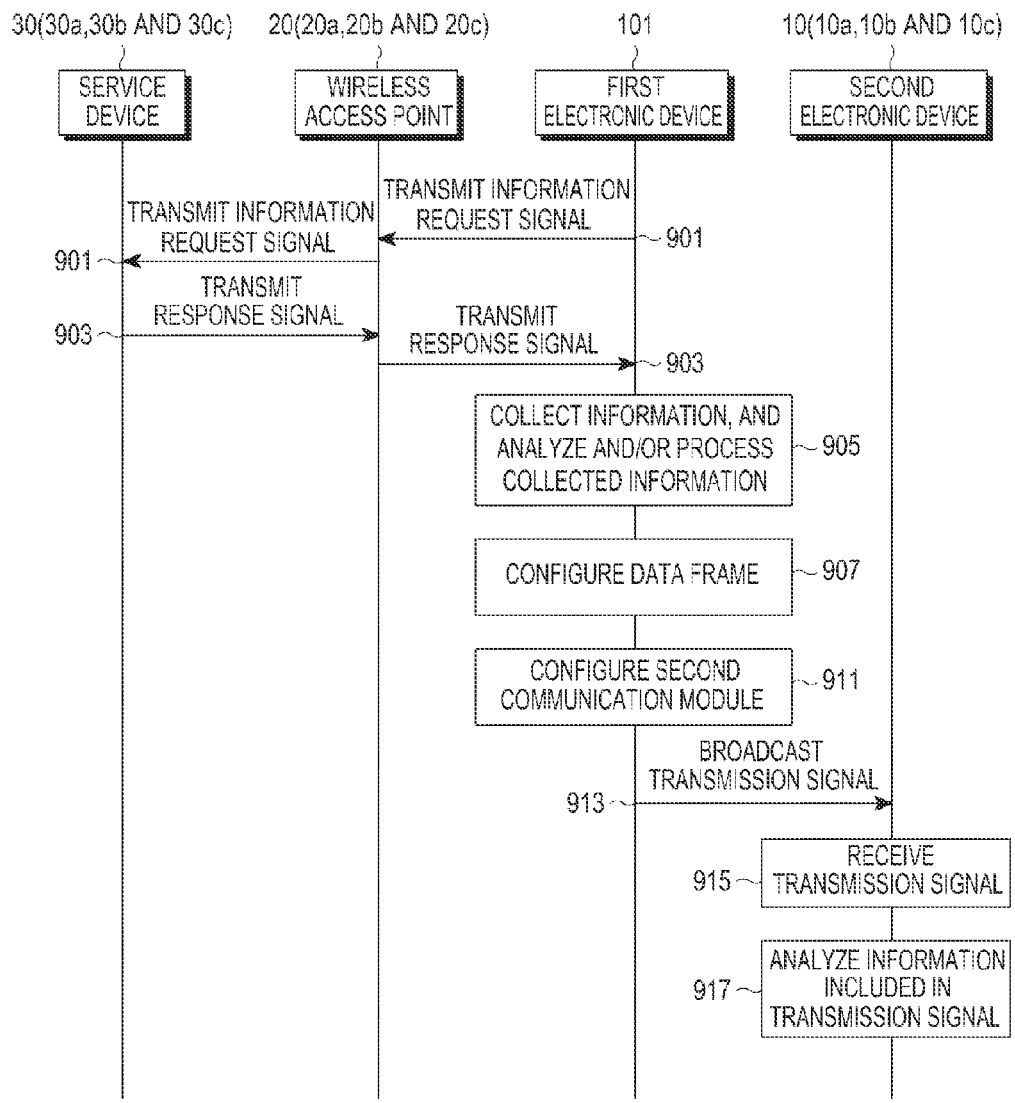
FIG. 9 is a diagram illustrating a signal processing flow in a wireless network system using an electronic device, according to various embodiments of the present disclosure.

FIG. 9 is a diagram illustrating a signal processing flow in the wireless network system using the electronic device, according to various embodiments of the present disclosure.

The first electronic device 101 receives a transmission signal that is periodically or aperiodically transmitted by one or more wireless access points 20, as described in FIG. 5, and may collect one or more pieces of information (e. g., network-related information) that are managed by the wireless access points 20 through the transmission signal. The first electronic device 101 may be connected with one or more wireless access points 20.

Referring to FIG. 9, in operation 901, the first electronic device 101 transmits an information request signal (access network query protocol (ANQP) query) to one or more service devices 30 (30*a*, 30*b*, and 30*c*) via one or more wireless access points 20 (20*a*, 20*b*, and 20*c*) through the first communication module (e.g., the first communication module 251 of FIG. 1). The one or more wireless access points 20 may be automatically connected to the one or more service devices 30 in order to thereby transmit the information request signal to the one or more service devices 30.

In operation 903, the one or more service devices 30 transmits a response signal (ANQP response) including one or more pieces of information to one or more wireless access points 20 that are connected thereto. In addition, one or more connected wireless access points 20 may transmit the received information response signal to the first electronic device 101 that requested the information.

In operation 905, the first electronic device 101 collects one or more pieces of information that is included in the received information response signal to thereby store the collected information, and analyzes and/or processes one or more pieces of the collected and stored information.

In operation 907, the first electronic device 101 configures a data frame that includes one or more pieces of the analyzed and/or processed information.

In operation 911, the first electronic device 101 configures the second communication module (e.g., one or more low-power and short-range communication interfaces, such as a BLE beacon, NFC, ZigBee, and/or NAN).

In operation 913, the first electronic device 101 transmits (e.g., broadcasts) a transmission signal that includes the configured data frame through the configured second communication module. The transmission signal, for example, may be a low-power and short-range transmission signal.

In operation 915, the one or more second electronic devices 10 receive the transmission signal while operating in the low-power and short-range communication standby mode. In operation 917, the one or more second electronic devices 10 analyze one or more pieces of the information included in the transmission signal.

When the one or more second electronic devices 10 are required to receive additional information on one or more pieces of the received information, as a result of the information analysis, the second electronic device may be automatically connected to the network in order to thereby receive the additional information. The one or more second electronic devices 10 may check whether one or more pieces of the information included in the transmission signal match pre-stored information, e.g., operator information of the Hotspot 2.0 credential. As a result of the check, if the information matches the pre-stored information, in operation 919, the one or more second electronic devices 10, for example, may perform a connection operation to the Hotspots 2.0 in order to be automatically connected to the service device 30 through one or more wireless access points 20. The one or more second electronic devices 10 may identify, in a low-power state, network-related information, venue information, and service information provided by the one or more service devices 30 in a venue, and may selectively perform the short-range communication for receiving the additional information.

Figure 10:
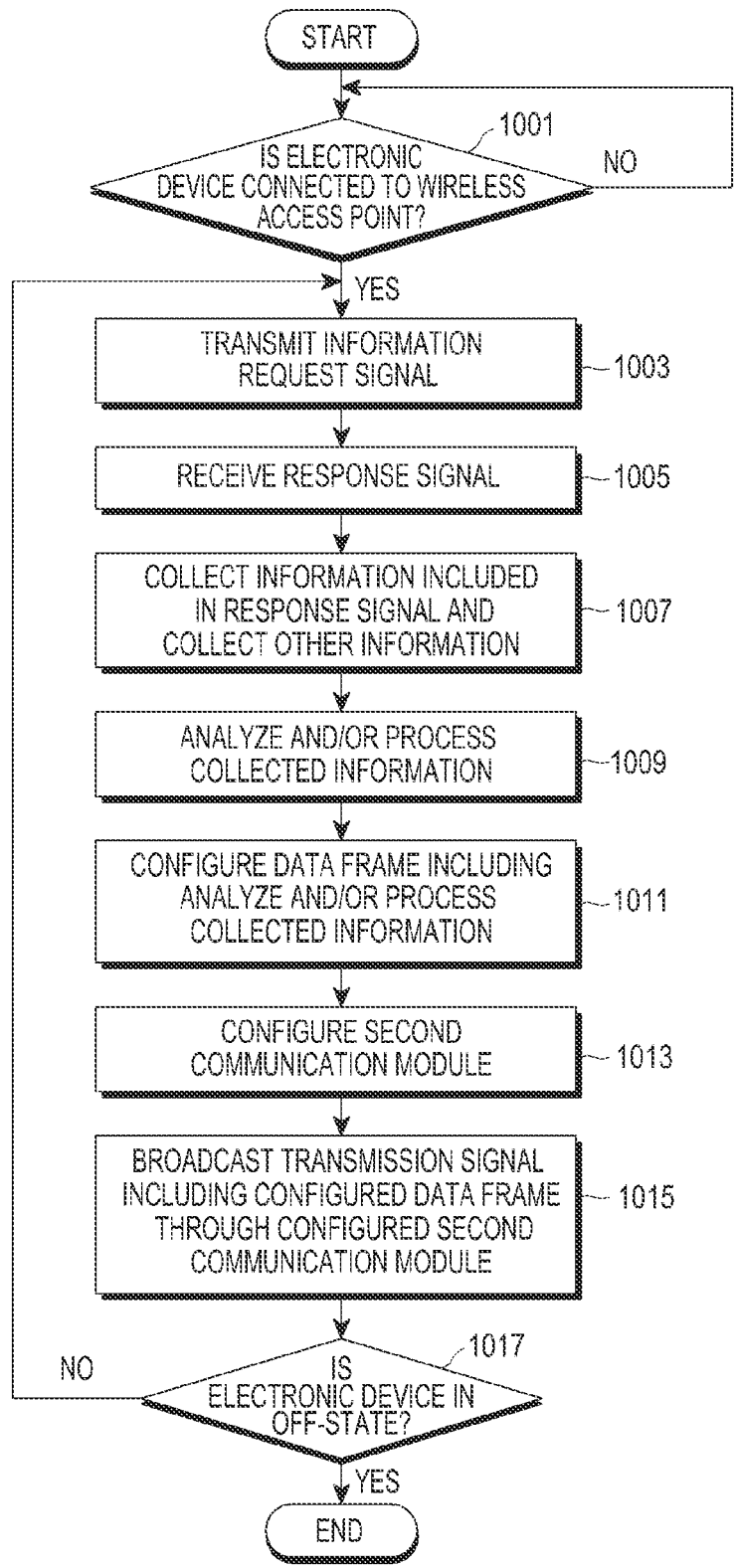
FIG. 10 is a flowchart illustrating the operation of an electronic device in a wireless network system using the electronic device, according to various embodiments of the present disclosure.

FIG. 10 is a flowchart illustrating the operation of an electronic device in a wireless network system using the electronic device, according to various embodiments of the present disclosure.

Referring to FIG. 10, in operation 1001, the first electronic device 101 checks whether the first electronic device 101 is connected to the wireless access points 20 through the first communication module. As a result of the check, if the first electronic device 101 is not connected to the wireless access points 20, the first electronic device repeats operation 1001. Although not shown in FIG. 10, the first electronic device 101 may perform the short-range communication discovery operation in order to thereby receive transmission signals that are periodically or aperiodically transmitted by one or more wireless access points 20.

The first electronic device 101 may collect network information {e.g., at least one of service set identifier (SSID) information, a channel list, the network capability, network load, and/or location information}, which is provided by the wireless access points 20, through the received transmission signal. In addition, as described in FIG. 7, when the first communication module (e.g., the short-range communication module) of the first electronic device 101 is in the off-state, the first electronic device may maintain the low-power and short-range communication standby mode in order to thereby play the same role as the second electronic device 10.

If the first electronic device 101 is connected to the wireless access points 20, in operation 1003, the first electronic device 101 transmits an information request signal to the wireless access points 20.

In operation 1005, the first electronic device 101 receives a response signal in response to the information request, the response signal including one or more pieces of information provided by the service device 30.

In operation 1007, the first electronic device 101 collects one or more pieces of information (i.e., the first information) contained in the response signal. One or more pieces of the collected information may be information that cannot be transmitted by the wireless access points 20. In addition, the first electronic device 101 may collect one or more pieces of information (i.e., the second information) from among its own stored information, GPS information, or information received from various sensors.

In operation 1009, the first electronic device 101 analyzes and/or processes one or more pieces of the collected information.

In addition, in operation 1011, the first electronic device 101 configures a data frame that includes one or more pieces of the analyzed and/or processed information. In the above-described operation, one or more pieces of information may be analyzed and/or processed, and the data frame may be configured.

In operation 1013, the first electronic device 101 configures the second communication module (e.g., one or more low-power and short-range communication interfaces) to receive the low-power and short-range transmission signal even when the first communication module (e.g., the short-range communication module) of the second electronic device 10 is in the off-state. When transmitting a single data frame, the first electronic device 101 may configure a single low-power and short-range communication interface (e.g., a NAN interface) to be turned on. When transmitting a plurality of data frames that are distinguished from each other by different service identifiers, the first electronic device 101 may configure a plurality of low-power and short-range communication interfaces (e.g., NAN, a BLE beacon, NFC, and/or ZigBee) to transmit different data frames, respectively. The first electronic device 101 may configure data frames such that two or more data frames, which are distinguished by different service IDs, are transmitted in sequence through a single low-power and short-range communication interface.

In operation 1015, the first electronic device 101 transmits (e.g., broadcast) a transmission signal including the configured data frames through the configured second communication module (one or more low-power and short-range communication interfaces).

In operation 1017, if the first electronic device 101 is in the off-state, the sequence ends, otherwise, operation 1001 is repeated.

Figure 11:
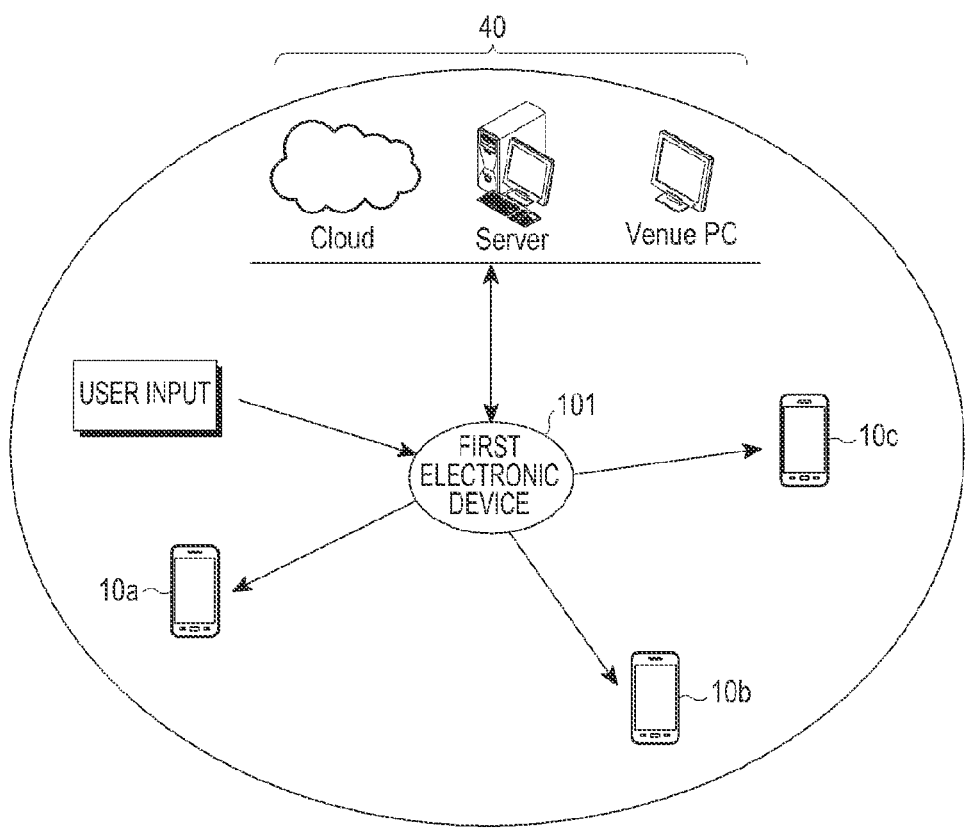
FIG. 11 is a diagram illustrating a communication network system using an electronic device, according to various embodiments of the present disclosure.

FIG. 11 is a diagram illustrating a communication network system using an electronic device, according to various embodiments of the present disclosure.

Referring to FIG. 11, the first electronic device 101 may be applied to the communication network system. In addition, in the communication network system using the first electronic device 101, the first electronic device 101 may be directly connected to one or more service devices 40, such as local PCs, servers, or clouds, through the first communication module in order to thereby collect one or more pieces of information. In addition, the first electronic device 101, for example, may collect information received from the user, as one or more pieces of information, through the first communication module.

Figure 12:
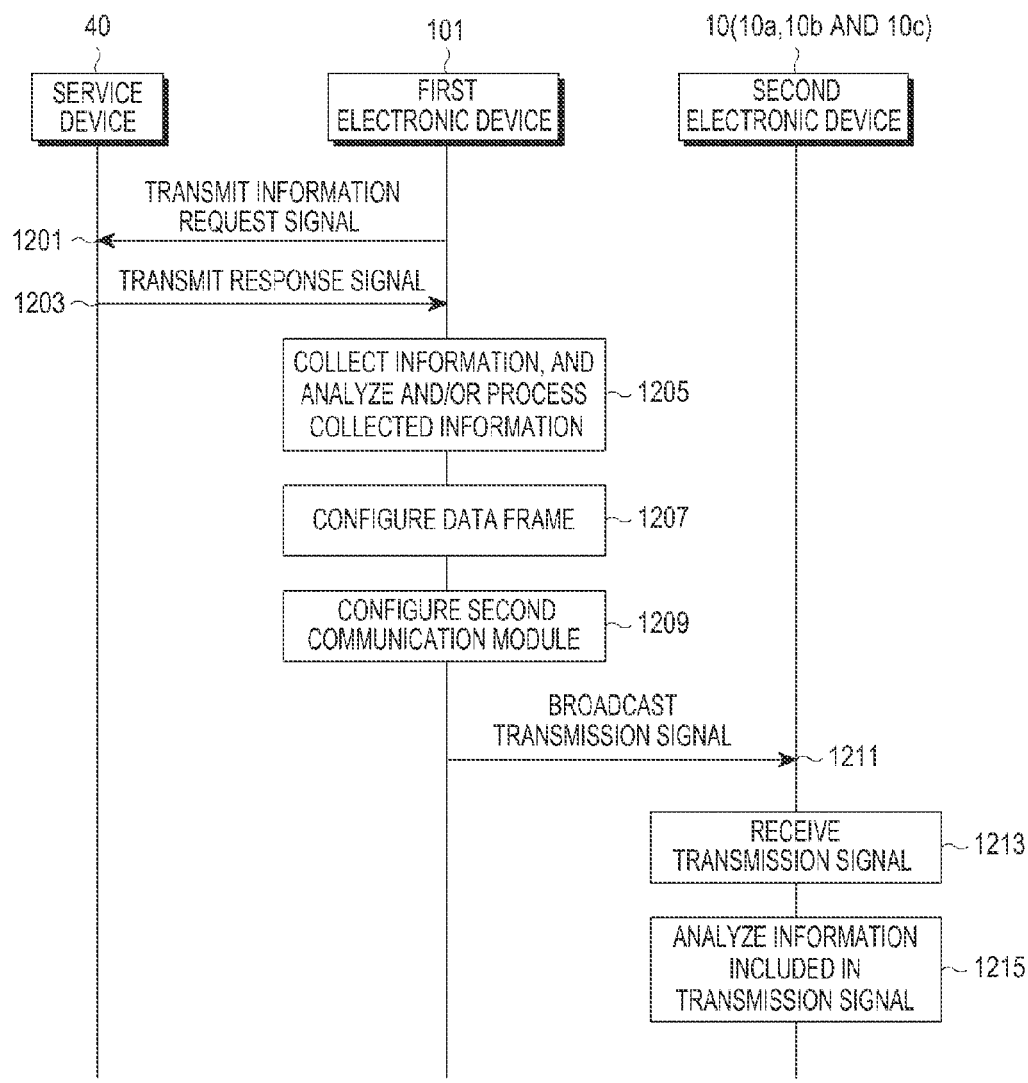
FIG. 12 is a diagram illustrating a signal processing flow in a communication network system using an electronic device, according to various embodiments of the present disclosure.

FIG. 12 is a diagram illustrating a signal processing flow in a communication network system using the electronic device, according to various embodiments of the present disclosure.

Referring to FIG. 12, in operation 1201, the first electronic device 101 connects with one or more service devices 40 through the first communication module, and thereby transmits an information request signal to the service devices 40.

In operation 1203, the first electronic device 101 receives a response signal including one or more pieces of information provided by the one or more service devices 40.

In operation 1205, the first electronic device 101 collects one or more pieces of information included in the received information response signal. The collected information may include, for example, at least one of venue information, or service information (e.g., notification, advertisement, events, and purchase information). The first electronic device 101 may collect and store one or more pieces of information input by the user. In addition, the first electronic device 101 may analyze and/or process one or more pieces of the collected information.

In operation 1207, the first electronic device 101 configures a data frame that includes one or more pieces of the analyzed and/or processed information. In step 1209, the first electronic device 101 configures the second communication module (e.g., one or more low-power and short-range communication interfaces, such as a BLE beacon, NFC, ZigBee, and/or NAN compliant interfaces).

In operation 1211, the first electronic device 101 transmits (e.g., broadcasts) a transmission signal that includes the configured data frame through the configured second communication module, e.g., one or more low-power and short-range communication interfaces. The transmission signal, for example, may be a low-power and short-range transmission signal.

In operation 1213, the one or more second electronic devices 10 receive the transmission signal while operating in the low-power and short-range communication standby mode. In operation 1215, the one or more second electronic devices 10 analyze one or more pieces of the information included in the transmission signal.

Figure 13:
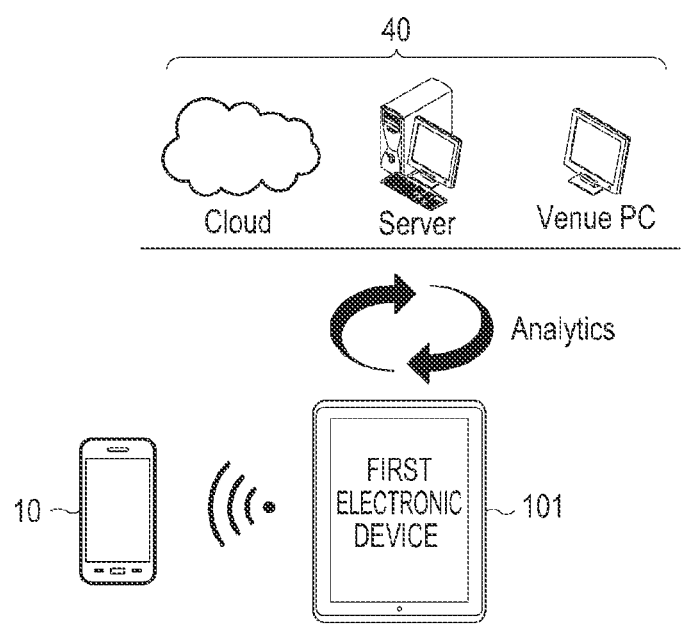
FIG. 13 is a diagram illustrating a signal processing flow in a communication network system using an electronic device, according to various embodiments of the present disclosure.

FIG. 13 is a diagram illustrating a signal processing flow in a communication network system using an electronic device, according to various embodiment of the present disclosure.

Referring to FIG. 13, the first electronic device 101 may analyze the information, such as the service type, or applications, by using one or more pieces of the analyzed and/or processed information, and may register the analyzed information in the connected service devices 40. The information to be registered may include location and identification information of the first electronic device 101. The service devices 40 (e.g., a service device acting as a central device) may also analyze the registered information for each location, and may transmit the analyzed information back to the first electronic device 101. The results of the analysis received from the service devices 40 may be transmitted to the second electronic device 10 through the second communication module.

Figure 14:
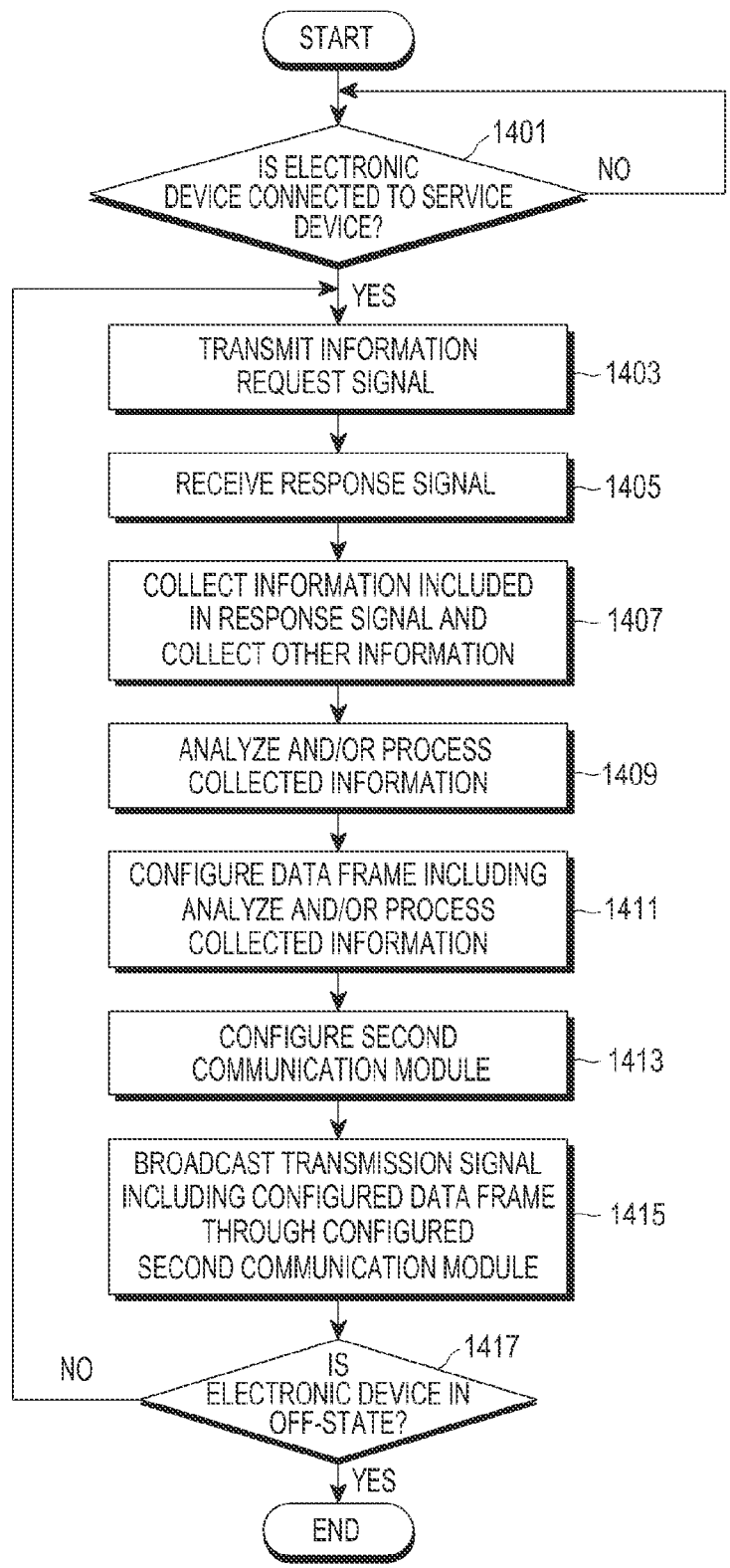
FIG. 14 is a flowchart illustrating the operation of an electronic device in a communication network system using the electronic device, according to various embodiments of the present disclosure.

FIG. 14 is a flowchart illustrating the operation of the electronic device in the communication network system using the electronic device, according to various embodiments of the present disclosure.

Referring to FIG. 14, in step 1401, the electronic device 101 checks whether the first electronic device 101 is connected to one or more service devices 40. If the first electronic device 101 is not connected to the one or more service devices 40, the first electronic device repeats step 1401.

Although not shown in FIG. 14, the first electronic device 101 may perform a first communication (e.g., short-range communication) discovery operation in order to thereby receive transmission signals that are periodically or aperiodically transmitted by one or more service devices 40. The first electronic device 101 may collect, as the one or more pieces of information, network information (e.g., at least one of service set identifier (SSID) information, a channel list, the network capability, network load, and/or location information), which is managed by the wireless access points 20, through the received transmission signal.

If the first electronic device 101 is connected to one or more service devices 40, in operation 1403, the first electronic device 101 transmits an information request signal to one or more of the third electronic devices.

In operation 1405, the first electronic device 101 receives one or more response signals, which include one or more pieces of information provided by one or more service devices 40.

In operation 1407, the first electronic device 101 collects one or more pieces of information contained in the response signal through the first communication module, and may store the collected information. The one or more pieces of information, for example, may include at least one of venue information, or service information (e.g., notification, advertisement, events, and purchase information). The first electronic device 101 may collect and store one or more pieces of information input by the user. The first electronic device 101 may collect at least one piece of information (the second information) from among information stored in its own storage medium, running service (or application) information, GPS information, or information received from various sensors.

In operation 1409, the first electronic device 101 may analyze and/or process one or more pieces of the collected information. In operation 1411, the first electronic device 101 configures a data frame that includes one or more pieces of the analyzed and/or processed information. In the operation above, which is described in further detail with reference to FIG. 7, one or more pieces of information may be analyzed and/or processed, and the data frame may be configured.

In operation 1413, the first electronic device 101 configures the second communication module (e.g., the low-power and short-range communication interface) to receive the low-power and short-range transmission signal even when the short-range communication module of the second electronic device 10 is in the off-state. When transmitting a single data frame, the first electronic device 101 may configure a single low-power and short-range communication interface (e.g., a NAN interface) to be turned on. When transmitting a plurality of data frames that are distinguished from each other by different service identifiers (IDs), the first electronic device 101 may configure a plurality of low-power and short-range communication interfaces (e.g., NAN, a BLE beacon, NFC, and/or ZigBee) to be turned on and to transmit different data frames, respectively. The first electronic device 101 may configure such that a plurality of data frames, which are distinguished by different service IDs, are transmitted in sequence through a single low-power and short-range communication interface.

In operation 1415, the first electronic device 101 transmits (e.g., broadcasts) a transmission signal including the configured data frames through the configured second communication module.

In operation 1417, if the first electronic device 101 is in the off state, the sequence ends. Otherwise, step 1403 is repeated.

If the short-range communication module is not in the on-state as described in FIG. 7, the first electronic device 101 may maintain the low-power and short-range communication standby mode. The first electronic device 101 may also play the same role as the second electronic device 10. The first electronic device 101 may receive the low-power transmission signal through the low-power and short-range communication discovery operation, and may collect one or more pieces of information. The first electronic device 101 may store one or more pieces of the collected information, and then, when the short-range communication module is turned on again, the first electronic device 101 may transmit one or more pieces of information related to the collected information to the nearby second electronic devices 10.

Figure 15:
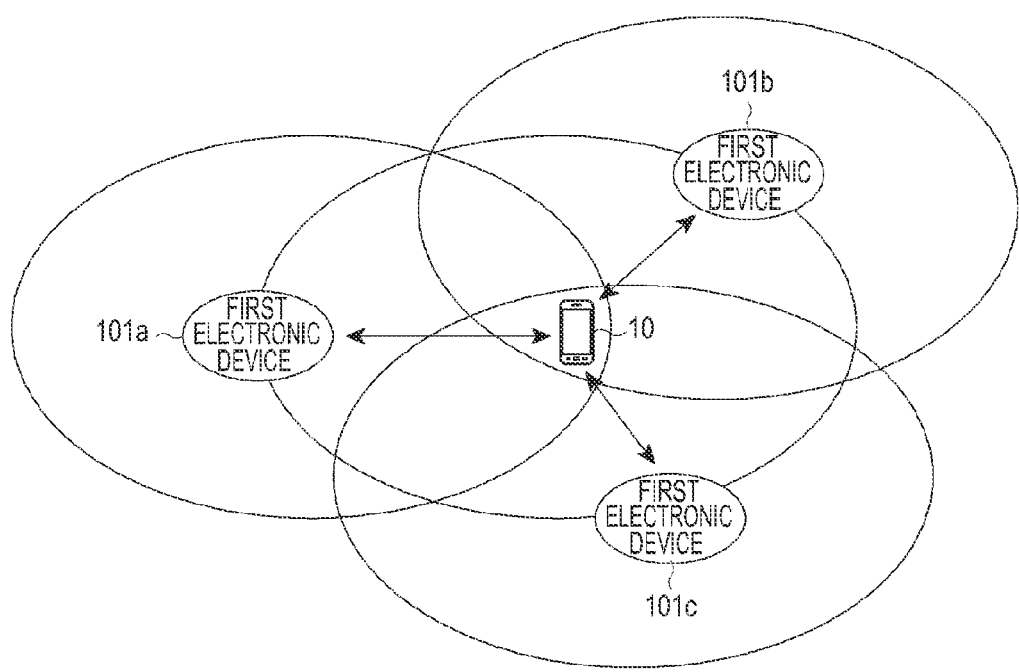
FIG. 15 is a diagram illustrating a communication network system using a plurality of electronic devices, according to various embodiments of the present disclosure.

FIG. 15 is a diagram illustrating a communication network system using a plurality of electronic devices, according to various embodiments of the present disclosure.

Referring to FIG. 15, a plurality of the first electronic devices 101a, 101b, and 101c may be used in the communication network system, and one or more pieces of information that are transmitted by the plurality of the first electronic devices 101a, 101b, and 101c may vary according to the location and state of the first electronic devices 101a, 101b, and 101c. One or more pieces of the collected information may include at least one of, for example, network information, nearby network location information, or location information of the first electronic devices. For example, if the first electronic devices 101a, 101b, and 101c are mobile communication devices, the first electronic devices may support a function of transmitting and receiving one or more pieces of the collected information. For example, if the first electronic devices 101a, 101b, and 101c share discovery information (scan information) of the transmission signal with each other, all of the first electronic devices 101a, 101b, and 101c may be electronic devices that perform a function of collecting and transmitting one or more pieces of information. The one or more second electronic devices may receive one or more pieces of transmitted information in order to thereby estimate a transmitted signal discovery result (scan result) at its own location.

Figure 16:
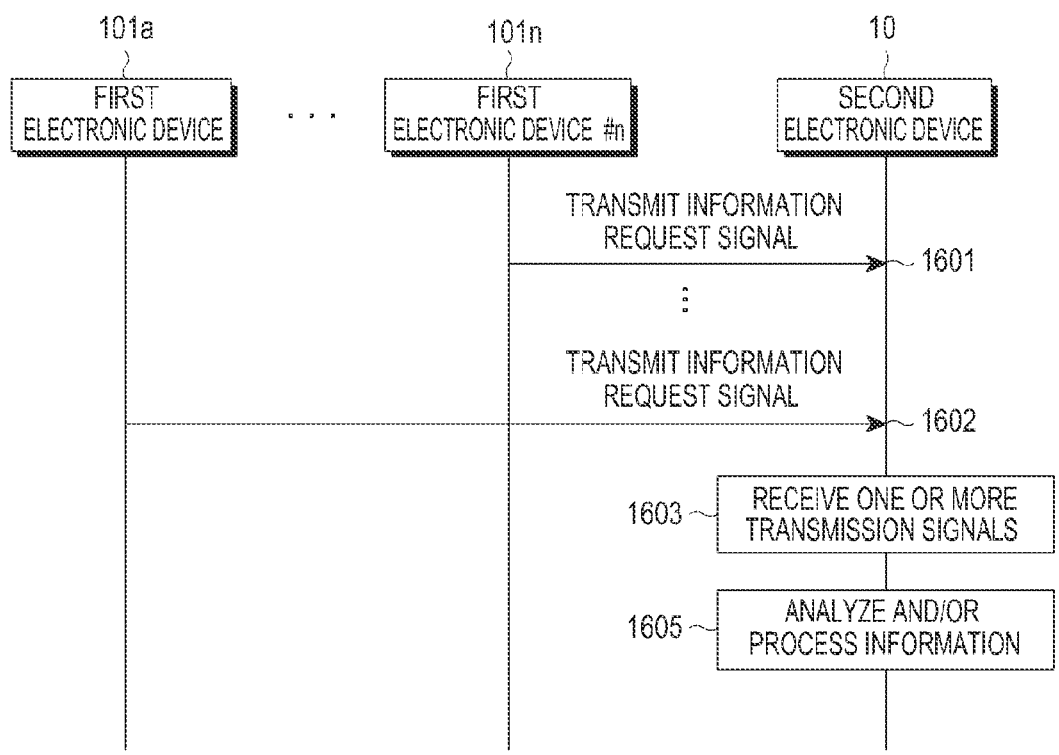
FIG. 16 is a diagram illustrating a signal processing flow in a communication network system using a plurality of electronic devices, according to various embodiments of the present disclosure.

FIG. 16 is a diagram illustrating a signal processing flow in a communication network system using a plurality of electronic devices, according to various embodiments of the present disclosure.

As described herein above, a plurality of the first electronic devices 101 (101a, 101b, and 101c) may: collect one or more pieces of information from at least one of the service devices 30 that are connected through the wireless access points 20, the directly connected service devices 40, or the user input; analyze and/or process one or more pieces of the collected information; and configure the data frame that includes one or more pieces of the analyzed and/or processed information.

Referring to FIG. 16, in operation 1601, the first electronic devices 101 (101a, . . . , 101n) transmit (e.g., broadcast) a transmission signal including the configured data frame to the one or more second electronic devices 10.

The second electronic devices 10 receive the transmission signal in operation 1603, and the second electronic devices 10 analyze one or more pieces of information included in the transmission signal in operation 1605. If one or more pieces of the information include network information and location information of the first electronic devices 101, the second electronic devices 10 may compare the same with its own location information in order to thereby filter one or more pieces of information that are received from the first electronic device 101 that belongs to the outside of the communication area. The one or more second electronic devices 10 may estimate their own location information by using the location information included in one or more pieces of the information received from the one or more first electronic devices 101.

As described above, in the communication network system using the one or more first electronic devices, the one or more first electronic devices 101 may perform the same operations shown and described with reference FIG. 7, so a further detailed description thereof is omitted.

Figure 17:
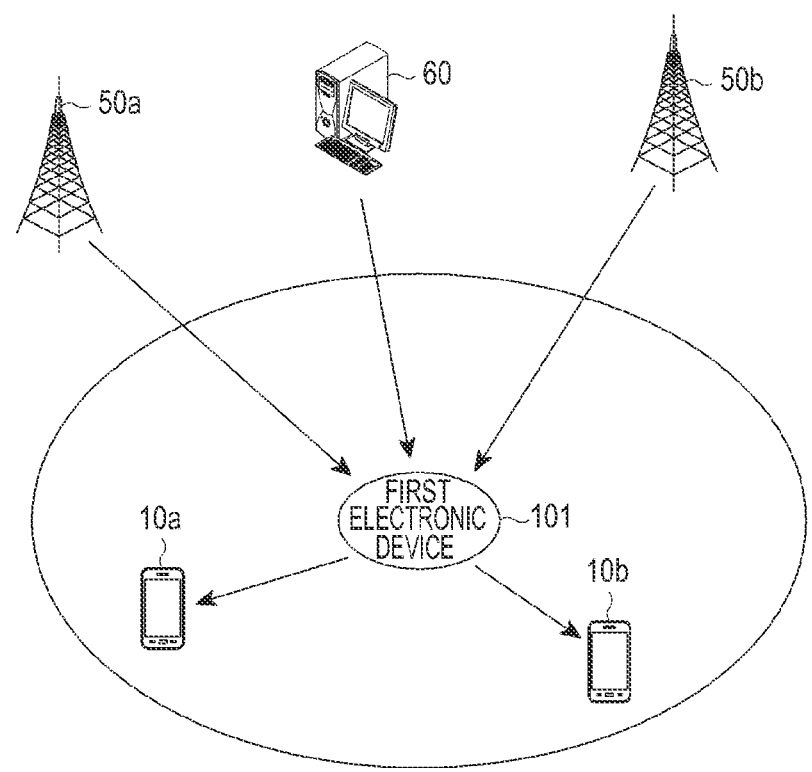
FIG. 17 is a diagram illustrating a mobile (cellular) communication network system using an electronic device, according to various embodiments of the present disclosure.

FIG. 17 is a diagram illustrating a module communication network system using a first electronic device, according to various embodiments of the present disclosure.

Referring to FIG. 17, the first electronic device 101 may be applied to the mobile communication network system, in the mobile communication network system using the first electronic devices 101, the first electronic devices 101 may collect one or more pieces of information to be transmitted to the second electronic devices 10a and 10b in an environment supporting the mobile communications network.

The first electronic device 101 may be connected with base stations 50a and 50b in the mobile communication network, and may collect one or more pieces of information through the first communication module (i.e., the mobile communication module) by the discovery operation. One or more of the collected information may include at least one piece of mobile communication network information, operator information, channel status information, transmission rate information, or cell identifier (ID) information.

The first electronic device 101 may be connected to a policy server 60 (e.g., ANQP, or access network discovery and selection function (ANDSF)), which manages the connection with the mobile communication network and the wireless network (e.g., WiFi), in order to thereby collect policy information. The first electronic device 101, based on the corresponding policy, may transmit, to the electronic devices 10a and 10b, at least one piece of the policy information, or information regarding a recommended network at the current location through the second communication module.

The first electronic device 101 may simultaneously transmit wireless network information (e.g., Wi-Fi network information) and mobile communication information together with channel status information to the second electronic devices 10a and 10b through the second communication module. The second electronic devices 10a and 10b, which receive one or more pieces of the information, may analyze the wireless network information (e.g., Wi-Fi network information), the mobile communication information, and the channel status information, which are simultaneously received, in order to thereby use the same for network selection between heterogeneous networks.

Figure 18:
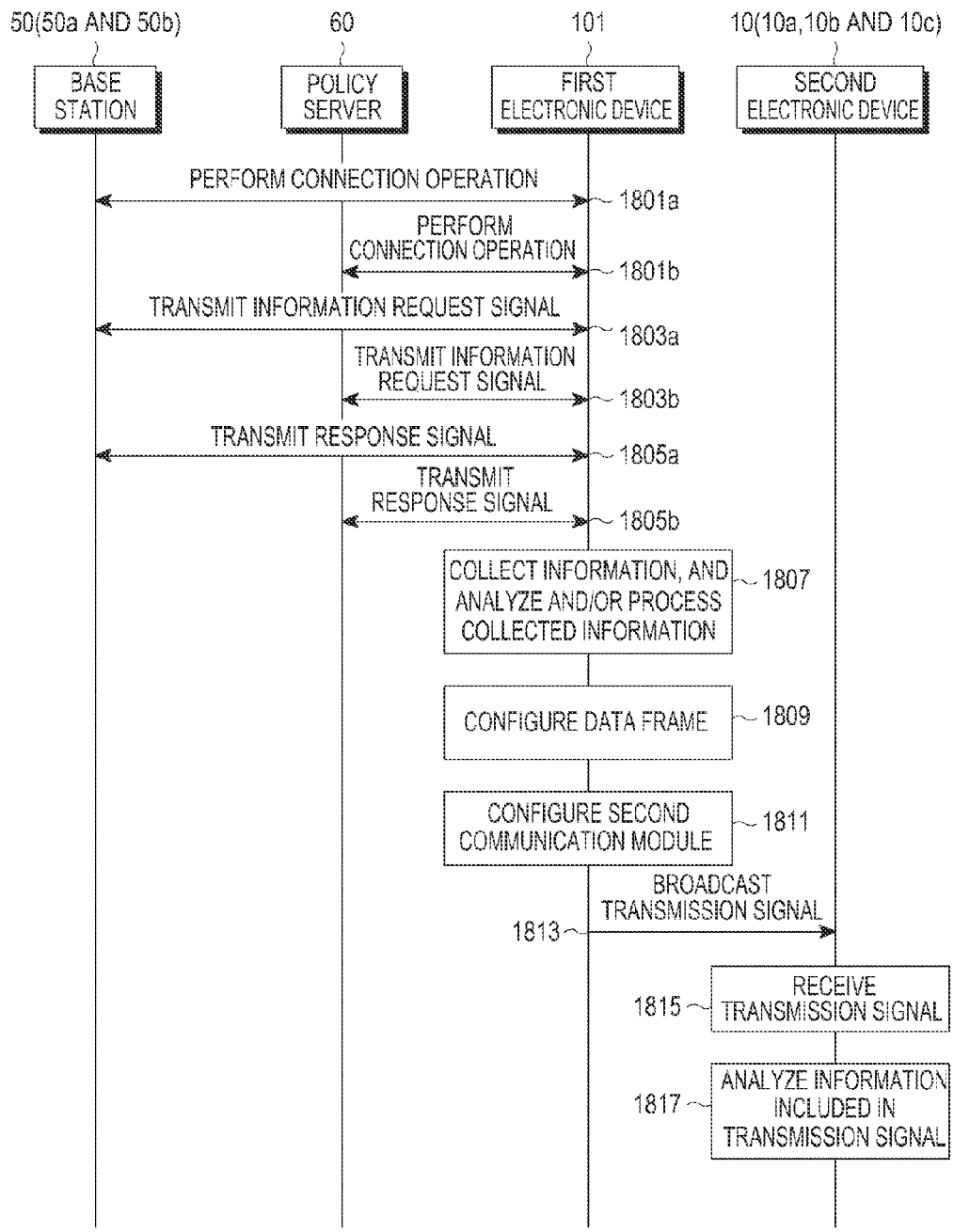
FIG. 18 is a diagram illustrating a signal processing flow in a mobile communication network system using an electronic device, according to various embodiments of the present disclosure.

FIG. 18 is a diagram illustrating a signal processing flow in a mobile communication network system using an electronic device, according to various embodiments of the present disclosure.

Referring to FIG. 18, in operation 1801a and 1801, the first electronic device 101 connects to one or more mobile communication network base stations 50 (50a and 50b) and a policy server 60, respectively, and transmits an information request signal. In operation 1803a and 1803b, the first electronic device 101 transmits the information request signal to the base stations 50 and the policy server 60, respectively, through the mobile communication network.

In operation 1805a and 1805b, the first electronic device 101 receives a response signal including one or more pieces of information from the base stations 50 and the policy server 60, respectively. The first electronic device 101 may collect one or more pieces of information that include one or more pieces of mobile communication network-related information from among network operator information, channel status information, transmission rate information, or cell identification information, which are provided by one or more base stations 50.

In addition, in operation 1805a and 1805b, the first electronic device 101 collects one or more pieces of information through transmission signals from the base stations 50 and the policy server 60, respectively.

In operation 1807, the first electronic device 101 collects and stores one or more pieces of information from the one or more base stations 50 and the one or more policy servers 60. The first electronic device 101 analyzes and/or processes one or more pieces of the collected and stored information.

In operation 1809, the first electronic device 101 configures a data frame that includes one or more pieces of the analyzed and/or processed information.

In operation 1811, the first electronic device 101 configures the second communication module (e.g., one or more low-power communication interfaces, such as a BLE beacon, NFC, ZigBee, and/or NAN).

In operation 1813, the first electronic device 101 transmits (e.g., broadcast) a transmission signal including the configured data frame through the configured second communication module, one or more low-power and short-range communication interfaces. The transmission signal may be, for example, a low-power and short-range transmission signal.

In operation 1815, the one or more second electronic devices 10 receive the transmission signal while operating in the low-power and short-range communication standby mode. In operation 1817, the one or more second electronic devices 10 analyze one or more pieces of the information included in the transmission signal. For example, the one or more second electronic devices 10 may analyze the wireless network information, the mobile communication network information, or the channel status information, which are simultaneously received with one or more pieces of the information. The one or more second electronic devices 10 may select a network between heterogeneous networks by using the analyzed information, and may be connected to the selected network.

Figure 19:
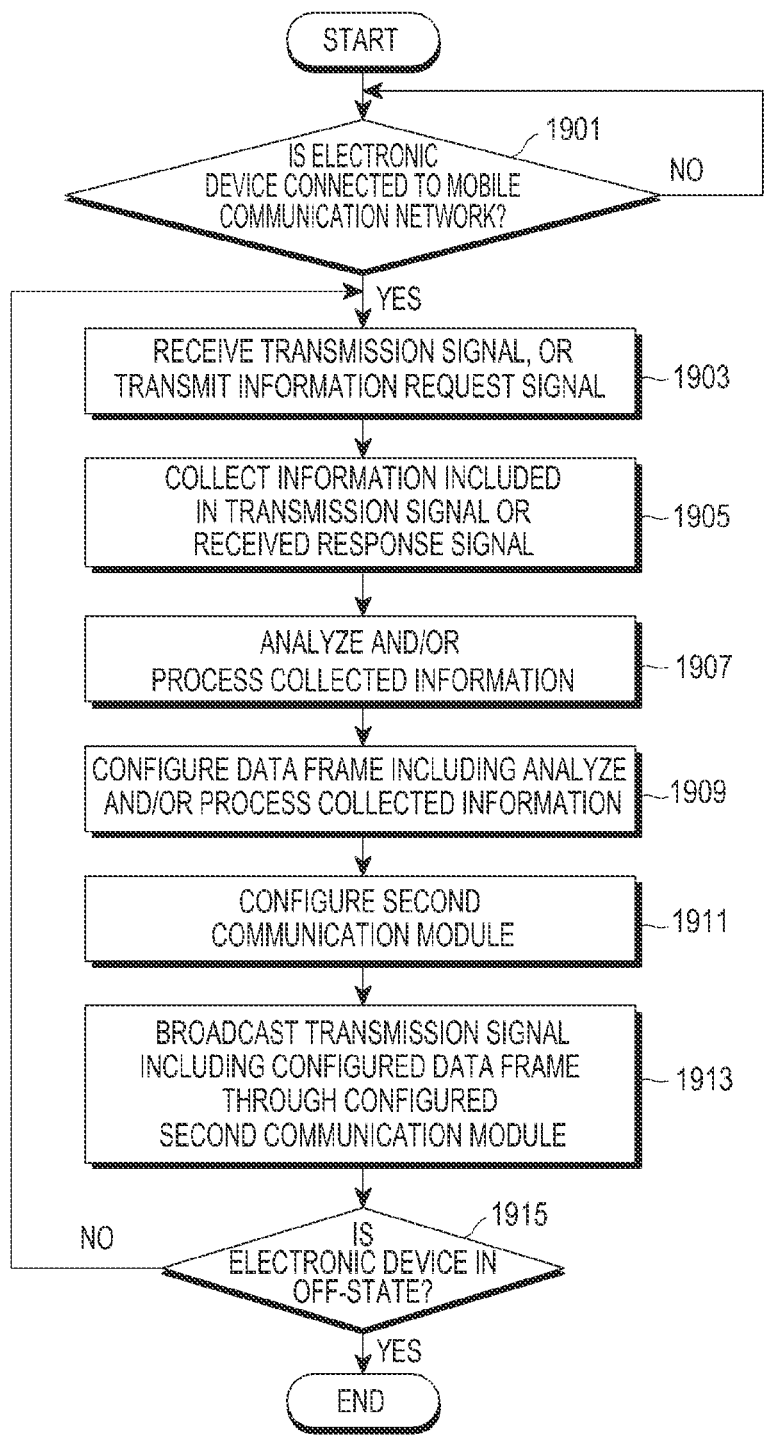
FIG. 19 is a flowchart illustrating the operation of collecting information by an electronic device in a mobile communication network system using the electronic device, according to various embodiments of the present disclosure.

FIG. 19 is a flowchart illustrating the operation of collecting information by an electronic device in a mobile communication network system using the electronic device, according to various embodiments of the present disclosure.

Referring to FIG. 19, in operation 1901, the electronic device 101 determines whether the first electronic device 101 is connected to the mobile communication network through the first communication module. As a result of the check, if the first electronic device 101 is not connected to the mobile communication network, operation 1901 is repeated.

However, if the first electronic device 101 is connected to the mobile communication network, in operation 1903, the first electronic device 101 transmits an information request signal to the base stations 50. The first electronic device 101 may receive a transmission signal that is periodically or aperiodically transmitted by one or more base stations 50 through a transmission signal discovery operation.

In operation 1905, the first electronic device 101 receives a response signal in response to the information request from the base station 50 through the first communication module, and collects one or more pieces of information included in the response signal. In addition, the first electronic device 101 may collect one or more pieces of information that is managed by the base station 50 through the receive transmission signal. One or more pieces of the information may include network-related information (e.g., at least one of unique identification information, a channel list, the mobile communication network capability, mobile communication network load, and/or cell information). In addition to the collected information through the first communication module (e.g., the first information), the first electronic device 101 may also collect at least one piece of information (the second information) from among information stored in its own storage medium, user input information, information measured by GPS or various sensors, running service information, and/or application information.

Next, in operation 1907, the first electronic device 101 analyzes and/or processes one or more pieces of the collected information. Then, in operation 1909, the first electronic device 101 configures a data frame that includes one or more pieces of the analyzed and/or processed information. Steps 1907 and 1909 may be performed as shown and described with reference to FIG. 7.

In operation 1911, the first electronic device 101 configures the second communication module (e.g., one or more low-power and short-range communication interfaces) to be in the on-state in order to receive the low-power and short-range transmission signal even when the first communication module of the second electronic device 10 is in the off-state. When transmitting a single data frame, the first electronic device 101 may configure a single low-power and short-range communication interface (e.g., a NAN interface) to be in the on-state. When transmitting a plurality of data frames that are distinguished from each other by different service identifiers, the first electronic device 101 may configure a plurality of low-power and short-range communication interfaces (e.g., NAN, A BLE beacon, NFC, and/or ZigBee) to be in the on-state in order to thereby transmit different data frames, respectively. The first electronic device 101 may configure such that a plurality of data frames, which are distinguished by different service IDs, are transmitted in sequence through a single low-power and short-range communication interface.

In operation 1913, the first electronic device 101 transmits (e.g., broadcasts) a transmission signal including the configured data frame through the configured second communication module.

In operation 1915, the first electronic device 101 is in the off-state, and if the first electronic device 101 is in the off-state, the sequence ends, otherwise, operation 1903 is repeated.

If the first communication module is not in the on-state as described in FIG. 7, the first electronic device 101 may maintain the low-power and short-range communication standby mode. The first electronic device 101 may play the same role as the second electronic device 10. In addition, the first electronic device 101 may receive the low-power transmission signal through the low-power and short-range communication discovery operation, and may collect one or more pieces of information. The first electronic device 101 may store one or more pieces of the collected information, and then, when the first communication module is converted to the on-state again, the first electronic device 101 may transmit one or more pieces of the stored information to the nearby second electronic devices 10.

Figure 20:
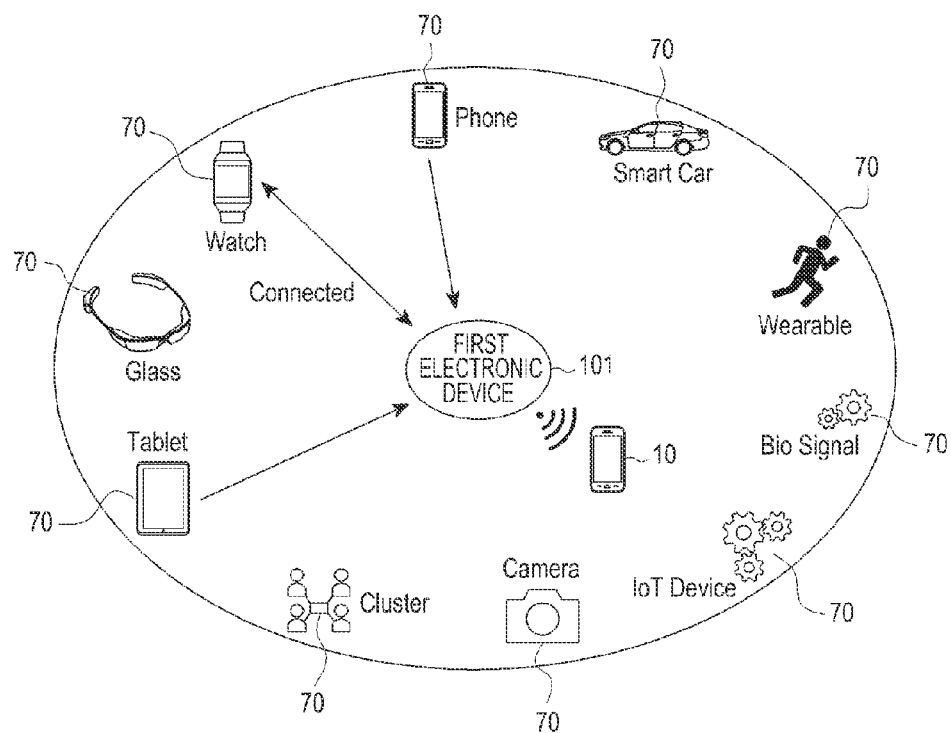
FIG. 20 is a diagram illustrating a P2P (peer to peer) network system using an electronic device, according to various embodiments of the present disclosure.

FIG. 20 is a diagram illustrating a P2P (peer to peer) network system using the electronic device, according to various embodiments of the present disclosure.

Referring to FIG. 20, the first electronic device 101 may be applied to the P2P network system. In addition, in the P2P network system using the first electronic device 101, the first electronic device 101 may collect one or more pieces of information in an environment that supports the P2P network.

In the P2P network system, the first electronic device 101 may be connected with one or more nearby electronic devices 70 (hereinafter, referred to as third electronic devices), which can support the P2P communication, through the first communication module (e.g., the P2P communication). The first electronic device 101 may collect one or more pieces of information provided from the one or more third electronic devices 70 through the P2P discovery (e.g., via at least one of BT, WiFi Direct, independent basic service set (IBSS), NFC, and/or ZigBee compliant communications). One or more pieces of the collected information may include at least one of device density, service configuration, the type of service, the type and status of the nearby third electronic device 70, service (including interest services) information, and/or application (including interest applications) information. The one or more third electronic devices 70 may include at least one of connected devices and non-connected devices. More specifically, third electronic devices 70, for example, may include at least one of wearable devices, smart cars, phones, electronic watches, E-glasses, tablets, clusters, communicational cameras, Internet of Things (IoT) devices, or bio-signal devices.

In addition, when the third electronic devices 70 support the low-power and short-range communication, the third electronic devices 70 can transmit and receive running service/application information or device status information between the third electronic devices 70, even when the third electronic devices 70 are not connected to the first electronic device 101. The first electronic device 101 may recognize the status and services of the third nearby electronic device 70, which are not in connection, by using the running service/application information or the device status information thereof.

The first electronic device 101 may analyze one or more pieces of the collected information, and may transmit one or more pieces of the analyzed information to the second electronic device 10 through the second communication module (e.g., one or more low-power and short-range communication interfaces). The first electronic device 101 may transmit the analyzed information to at least one of a local owner or the third nearby electronic devices 70.

In addition, in the P2P network system, the first electronic device 101 may perform a discovery operation utilizing the IEEE 802.11u protocol, and may act as a proxy for discovery of remote devices.

Figure 21:
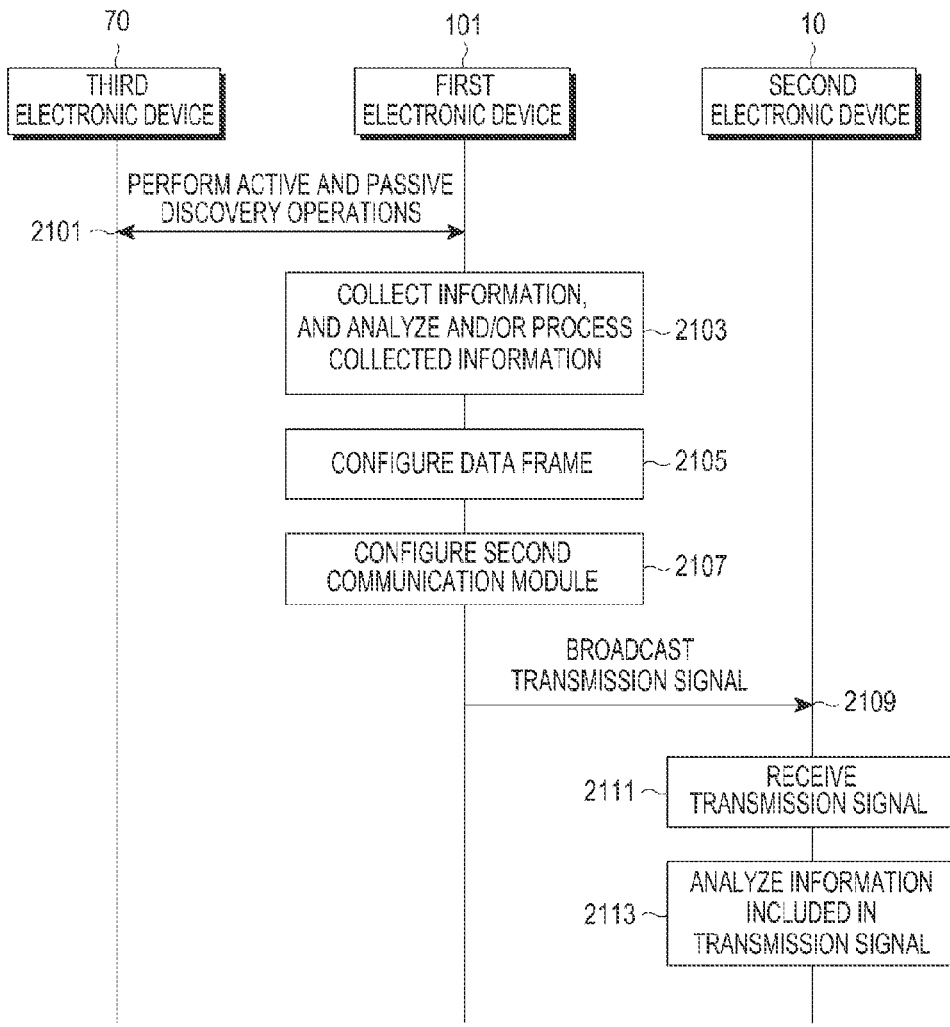
FIG. 21 is a diagram illustrating a signal processing flow in a P2P network system using an electronic device, according to various embodiments of the present disclosure.

FIG. 21 is a diagram illustrating a signal processing flow in the P2P network system using the electronic device, according to various embodiments of the present disclosure. Referring to FIG. 21, in operation 2101, the first electronic device 101 may perform an active discovery operation in order to thereby receive transmission signals transmitted from the one or more third electronic devices 70. The first electronic device 101 may perform a passive discovery operation for the one or more third electronic devices 70 (e.g., at least one of wearable devices, tablets, mobile devices, and/or smart cars). For instance, the first electronic device 101 may perform the connection operation through the first communication module in order to thereby receive a response signal including one or more pieces of information. The first electronic device 101, for example, may collect one or more pieces of information provided from the third nearby electronic devices 70 through the first communication module, e.g., a P2P discovery operation (at least one of BT, WiFi Direct, IBSS, NFC, and/or ZigBee), and may store one or more pieces of the collected information.

In operation 2103, the first electronic device 101 analyzes and/or process one or more pieces of the collected and stored information. In operation 2105, the first electronic device 101 configures a data frame that includes one or more pieces of the analyzed and/or processed information. In operation 2103 and operation 2105, as described herein with reference to FIG. 7, one or more pieces of information may be analyzed and/or processed, and the data frame may be configured.

In operation 2107, the first electronic device 101 may configure the second communication module (e.g., one or more low-power and short-range communication interfaces, such as a BLE beacon, NFC, ZigBee and/or NAN). In operation 2109, the first electronic device 101 transmits (e.g., broadcasts) a transmission signal including the configured data frame through one or more of the configured low-power and short-range communication interfaces. The transmission signal, for example, may be a low-power and short-range transmission signal.

In operation 2111, the one or more second electronic devices 10 receive the transmission signal through the discovery operation while operating in the low-power and short-range communication standby mode.

Figure 22:
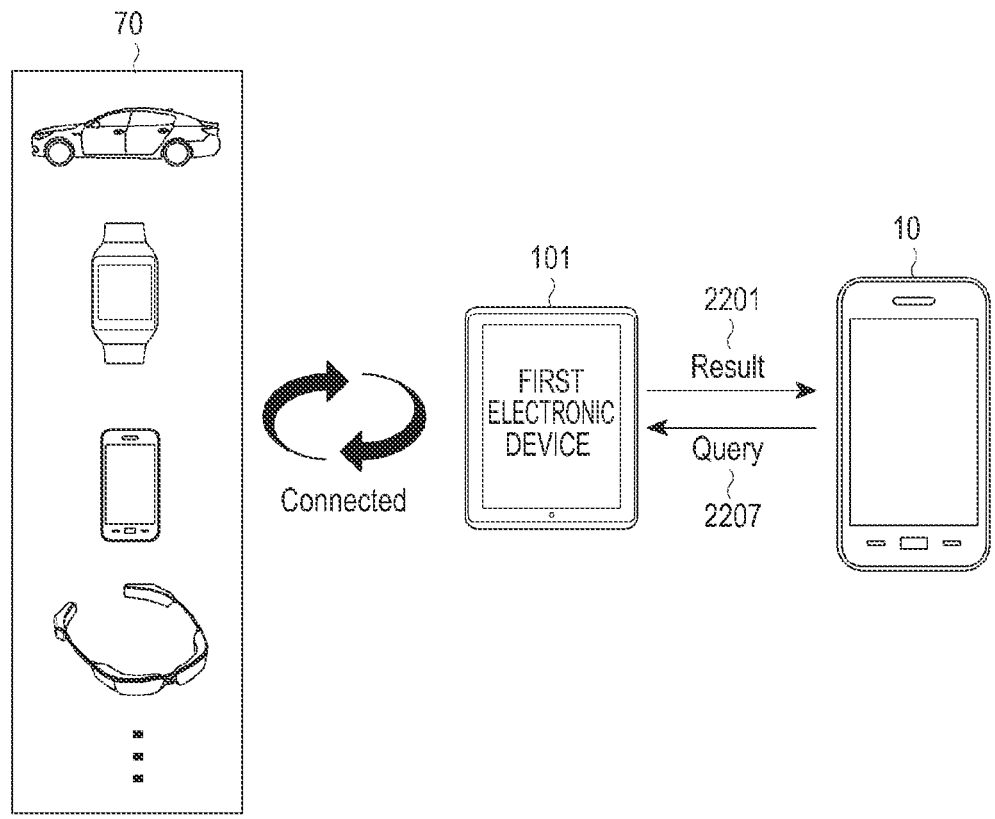
FIG. 22 is a diagram illustrating the operation of transferring additional information in a P2P network system using an electronic device, according to various embodiments of the present disclosure.

FIG. 22 is a diagram illustrating the operation of transferring additional information in a P2P network system using an electronic device, according to various embodiments of the present disclosure.

As shown in FIG. 22, when the first electronic device 101 is connected with the third electronic devices 70, the second electronic device 10 may receive, from the first electronic device 101, one or more pieces of information, as a response signal to a request, which includes at least one of identification information, running service information, running application information, terminal status information of the third electronic devices 70, or information related to the third nearby electronic devices that are not connected with the first electronic device 101.

In operation 2113, the second electronic device 10 analyzes one or more pieces of the information included in the transmission signal, and selectively configures the first communication module (e.g., the short-range communication module) to be in the on-state in order to obtain additional information. In operation 2201 of FIG. 22, the second electronic device 10 transmits an information request signal (query) for additional information to the first electronic device 101 through the first communication module, and in operation 2203, the second electronic device 10 receives the additional information through a response signal (result) from the first electronic device 101.

As described above, in the P2P network system, the first electronic device 101 may receive the transmission signal through the connection between the third electronic devices 70 or from the third electronic device 70, instead of being connected with the mobile communication network as shown and described in operation 1901 of FIG. 19, in order to thereby collect one or more pieces of information. Subsequent operations are the same as corresponding operations shown and described with reference to FIG. 19. Accordingly, the first electronic device 101 may analyze and/or process one or more pieces of the collected information, and may configure the data frame including one or more pieces of the processed information. The first electronic device 101 may transmit (e.g., broadcast) the transmission signal including the configured data frame through the configured short-range communication module (e.g., a low-power and short-range communication module).

Figure 23:
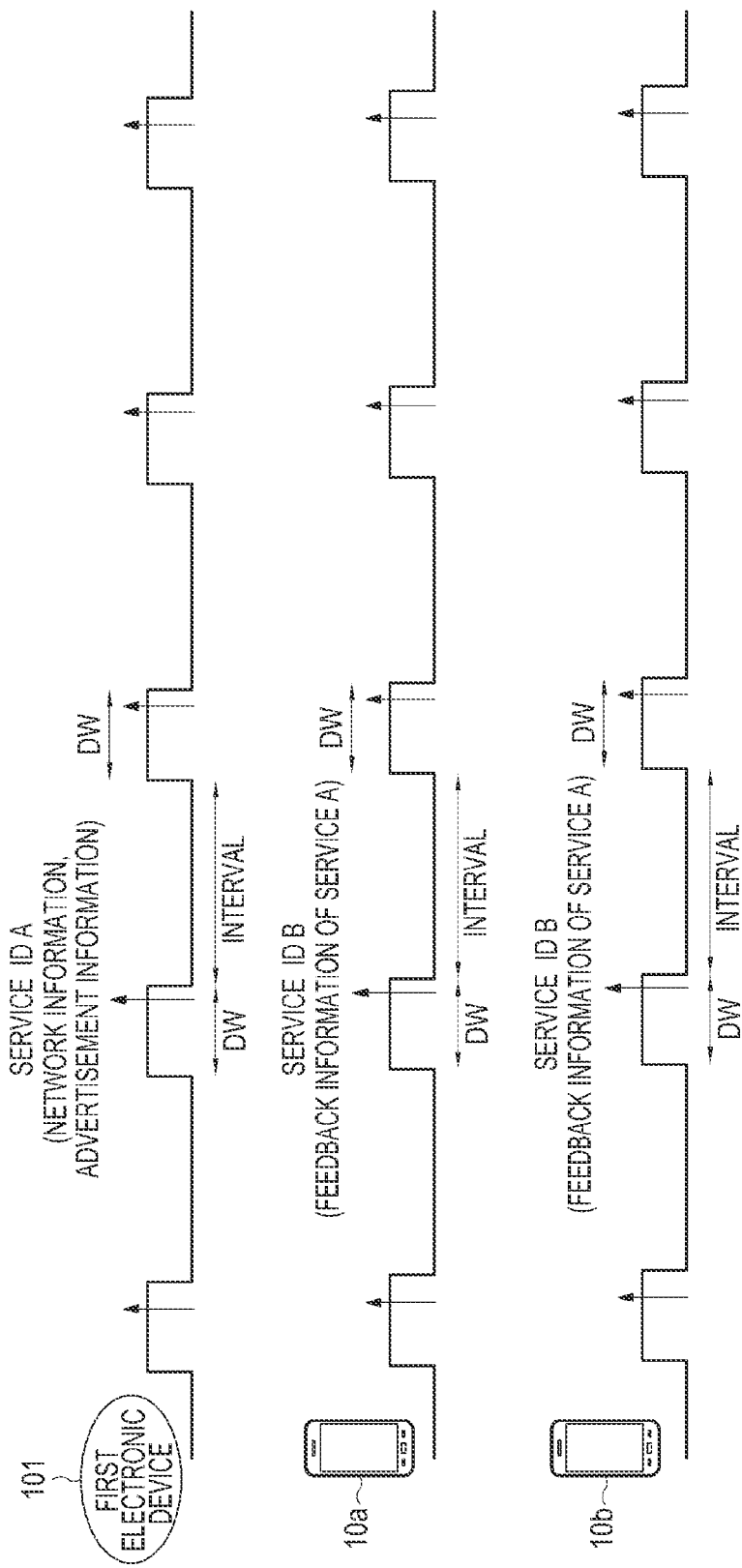
FIG. 23 is a diagram illustrating an example of the transmission and reception of information between the first electronic device and the second electronic device, according to various embodiments of the present disclosure.

FIG. 23 is a diagram illustrating an example of transmission and reception of information between the first electronic device and the second electronic device, according to various embodiments of the present disclosure. Referring to FIG. 23, when the first electronic device 101 supports the NAN, the first electronic device 101 may transmit (e.g., broadcast) a transmission signal including the first data frame that is assigned with the first service identification information (ID A) in a discovery period through one or more low-power and short-range communication modules (e.g., a NAN module).

The second electronic device 10, which has received the transmission signal, may transmit (e.g., broadcast) a transmission signal including the second data frame that is assigned with the second service identification information (ID B) in a discovery period through one or more low-power and short-range communication modules. The second data frame to be transmitted is feedback information of the first data frame. The second electronic device 10 may display one or more pieces of the information included in the first received data frame through a user UI, and when the user selects or deletes one or more pieces of the displayed information, may transmit the second data frame including feedback information.

The first electronic device 101 may discover the transmission signal transmitted from the second electronic device 10 through the discovery operation, and may receive the second data frame while checking the service identifier (ID A) that the first electronic device has assigned.

The operation in which the first electronic device transmits (e.g., broadcasts) one or more pieces of information to the one or more second electronic devices, according to according to various embodiments of the present disclosure, is described in detail herein as follows.

Figure 24:
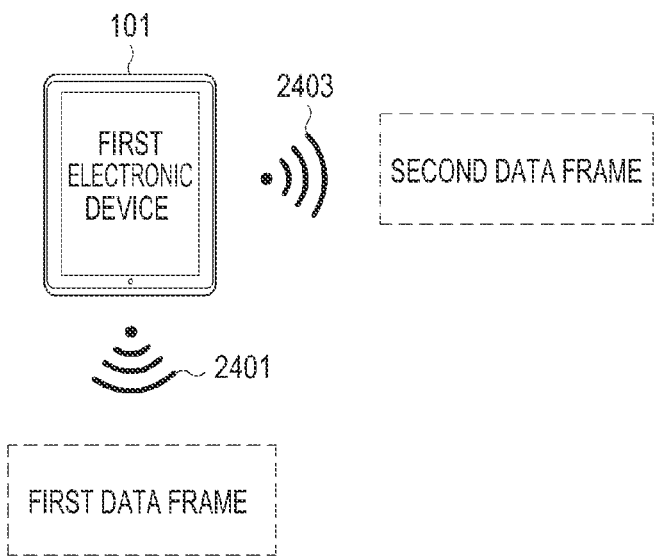
FIG. 24 is a diagram illustrating an example of transmitting collected information in an electronic device, according to various embodiments of the present disclosure.

FIG. 24 is a diagram illustrating an example of transmitting the collected information in the electronic device, according to various embodiments of the present disclosure.

Referring to FIG. 24, the first electronic device 101 may transmit one or more pieces of the information that is collected through the one or more second communication modules (e.g., one or more low-power and short-range communication interfaces). The first electronic device 101 may transmit the first and second transmission signals 2401 and 2403, which include the first data frame and second data frame, respectively, which are comprised of one or more pieces of information, through the one or more second communication modifies. The one or more second electronic devices may perform a low-power and short-range communication discovery operation in order to thereby receive the transmission signal.

As illustrated in FIG. 24, the first electronic device 101 may transmit different data frames through a plurality of low-power and short-range communication interfaces included in a plurality of second communication modules or the one or more second communication modules.

The first electronic device 101 may transmit a transmission signal that includes at least one of, for example, as service ID, simplification information, or synchronization information of the second low-power and short-range communication module through the first low-power and short-range communication interface that has a low data rate. The first electronic device 101 may also transmit a transmission signal including additional information corresponding to the service ID and synchronization information of the first low-power and short-range communication interface through the second low-power and short-range communication interface. Since one or more pieces of the information include the synchronization information on another communication interface, it is possible to increase the efficiency of the second electronic devices 10a and 10b for receiving one or more pieces of the information.

The second electronic device 10a and 10b, which receive one or more pieces of information through the first communication interface, may quickly synchronize a discovery window (DW) with the first electronic device 101 by using synchronization information of the second communication interface included in one or more pieces of the information, and may receive the additional information that is transmitted through the second low-power and short-range communication interface. The synchronization information may include at least one of signal (e.g., a beacon or service discovery frame) transmission time, a sleep period in which the transmission signal is not received, a period in which the transmission signal is transmitted, or information on a channel through which the transmission signal is transmitted.

In FIG. 24, the first low-power and short-range communication interface, for example, may be a communication module utilizing a small BLE beacon, and the second low-power and short-range communication interface, for example, may be a communication module utilizing the NAN. In addition, embodiments of the present disclosure are not limited to the BLE beacon or the NAN, and one or more pieces of information may be transmitted by using various low-power communication technologies. In addition, although two low-power and short-range communication interfaces are described in FIG. 24 for the convenience of explanation, according to an embodiment of the present disclosure, the first electronic device 101 may transmit one or more pieces of information by using more than two low-power and short-range communication interfaces. In addition, the first electronic device 101 may transmit one or more pieces of information through one or more short-range communication modules, or may transmit one or more pieces of information through a communication interface in the form of a combination of one or more low-power and short-range communication modules and one or more short-range communication modules.

In addition, in FIG. 24, the first electronic device 101 may configure the amount of transmission data differently according to the characteristics of each low-power and short-range communication interface.

The first electronic device 101 may transmit data frames that include one or more pieces of different information or one or more pieces of related information through respective low-power and short-range communication interfaces differently, or may simultaneously transmit the same data frame.

Figure 25:
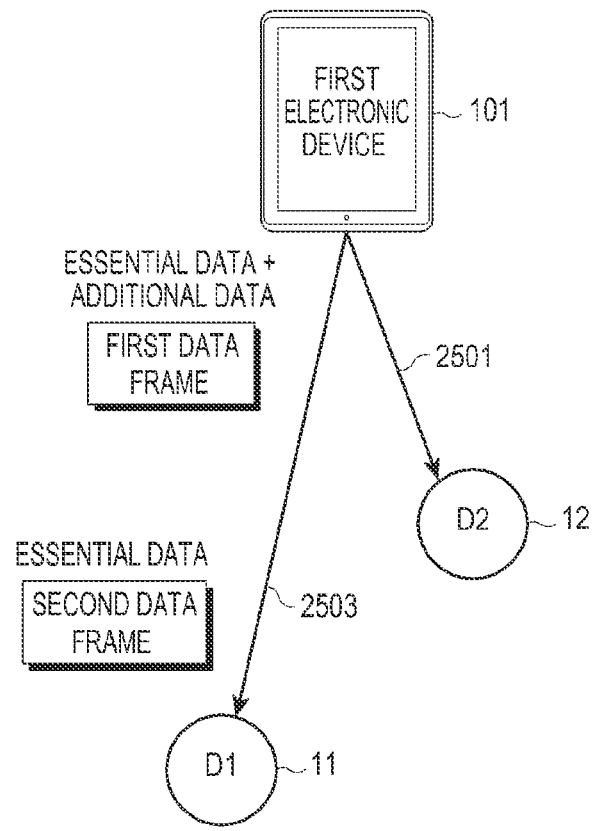
FIG. 25 is a diagram illustrating another example of transmitting collected information in an electronic device, according to various embodiments of the present disclosure.

FIG. 25 is a diagram illustrating another example of transmitting collected information in the electronic device, according to various embodiments of the present disclosure. Referring to FIG. 25, the first electronic device 101 may configure the data frames that include one or more pieces of different information for each coverage area, and may transmit transmission signals that include the different data frames to the one or more second electronic devices. The first electronic device 101 may use a hierarchical modulation technique. According to the features of the hierarchical modulation technique, the decoding of signals may be made with a higher modulation technique with respect to nearby electronic devices, whereas the decoding of signals may be made with a lower modulation technique with respect to remote electronic devices that are sensitive to errors. According to the features of the modulation technique, as a modulation level increases, it becomes increasingly difficult to decode the signals because it is sensitive to errors. For example, in the case of receiving 4-bit transmission streaming data, the data may be perfectly decoded to be '1011,' or may be partially decoded to be '01' a shortage of 2 bits, according to the status of the device.

The first electronic device 101 may: configure a data frame comprised of essential data and additional data; transmit the essential data and the additional data together; and selectively use the same according to a coverage of the device that receives the two pieces of data. For example, when the first electronic device 101 is used in a specific venue, the second electronic devices 11 and 12, which are located far away from the first electronic device 101, may receive at least one of simple information or simple service information, which are provided in the venue, whereas the second electronic device 12, which is located in the venue as the first electronic device 101, may receive addition information and detailed information as well as one or more pieces of the information that is received by the second electronic devices 11 and 12, which are located far away from the first electronic device 101.

As shown in FIG. 25, the first electronic device 101 may configure the first data frame including the essential data and the additional data, and may transmit the first transmission signal 2501 that includes the first data frame to the second nearby electronic device D2 (12). In addition, the first electronic device 101 may configure the second data frame including only the essential data, and may transmit the second transmission signal 2503 that includes the second data frame to the second remote electronic device D1 (11).

As described above, although one or more pieces of information are transmitted by using the hierarchical modulation technique in the present embodiment, the data frame may be configured to include one or more pieces of information to then be transmitted in various manners. The first electronic device 101 may simultaneously transmit the data frames that include one or more pieces of information by using different frequencies. A signal of a high frequency may transmit high-capacity data compared to a short coverage and a low frequency.

The first electronic device 101 may adopt an IEEE 80.211af/ah method that has a coverage of more than 1 Km among Wi-Fi standards for remote transmission, or may simultaneously transmit the signal encoded in a high capacity and the signal encoded in a low capacity. The first electronic device 101 may also adopt a technique of measuring a distance with respect to the one or more second electronic devices (e.g., round-trip delay time (RTT)).

Figure 26:
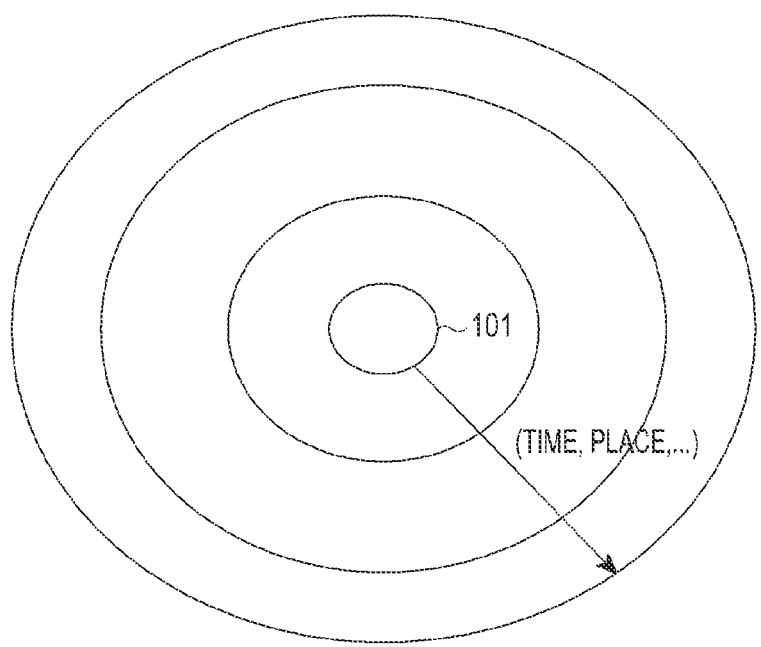
FIG. 26 is a diagram illustrating another example of transmitting collected information in an electronic device, according to various embodiments of the present disclosure.

FIG. 26 is a diagram illustrating another example of transmitting collected information in the electronic device, according to various embodiments of the present disclosure. Referring to FIG. 26, the first electronic device 101 may transmit one or more pieces of information that differ depending on the environmental conditions (at least one of ambient conditions, time, and/or location).

The first electronic device 101 may analyze one or more pieces of information that is collected by monitoring the surroundings, and may recognize the frequency of use of the short-range communication module. The first electronic device 101 may change and configure the low-power and short-range communication interface according to the frequency of use of the low-power and short-range communication interface that is recognized.

When the security of the network is enhanced, the first electronic device 101 may also process one or more pieces of the collected information by limiting some thereof, and may transmit the processed information.

The first electronic device 101 may also analyze one or more pieces of information, such as at least one of, for example, device density, current used service distribution, device location information, or device status information, and may adjust a period of collecting and transmitting one or more pieces of information by using the analyzed information. For example, the first electronic device 101 may configure a long transmission period in a specific period of time when the second electronic devices are not busy.

According to an embodiment of the present disclosure, the first electronic device 101 may transmit one or more pieces of information related to the service only when the service desired by the one or more second electronic devices is the same as the service provided by the first electronic device.

Figure 27:
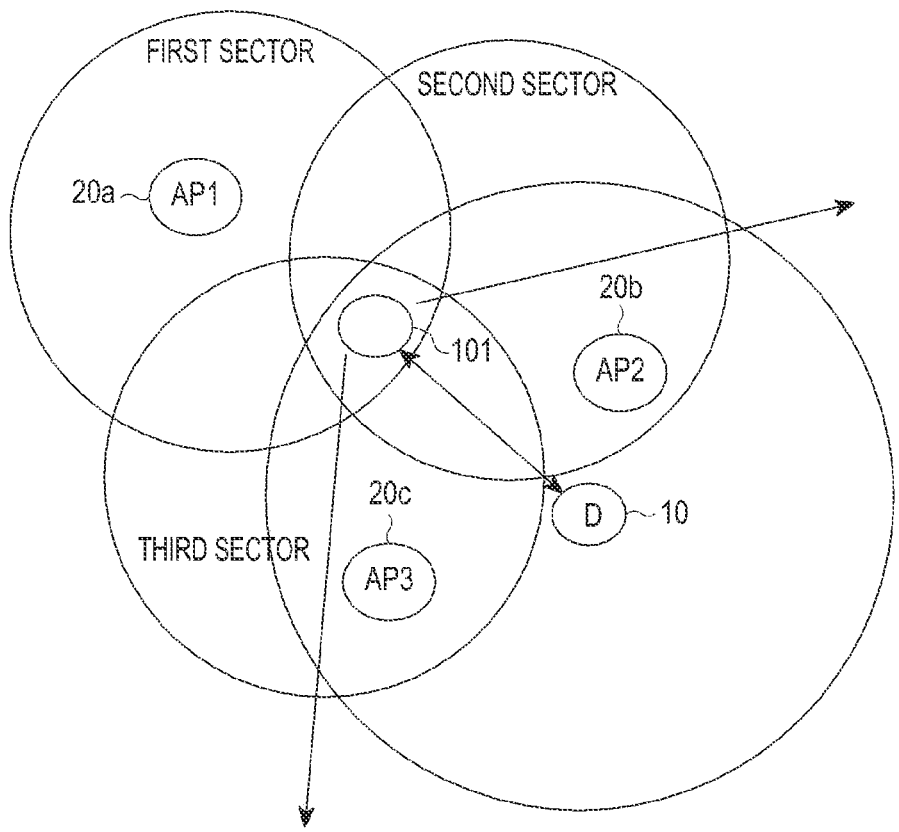
FIG. 27 is a diagram illustrating another example of transmitting collected information in an electronic device, according to various embodiments of the present disclosure.
Figure 28:
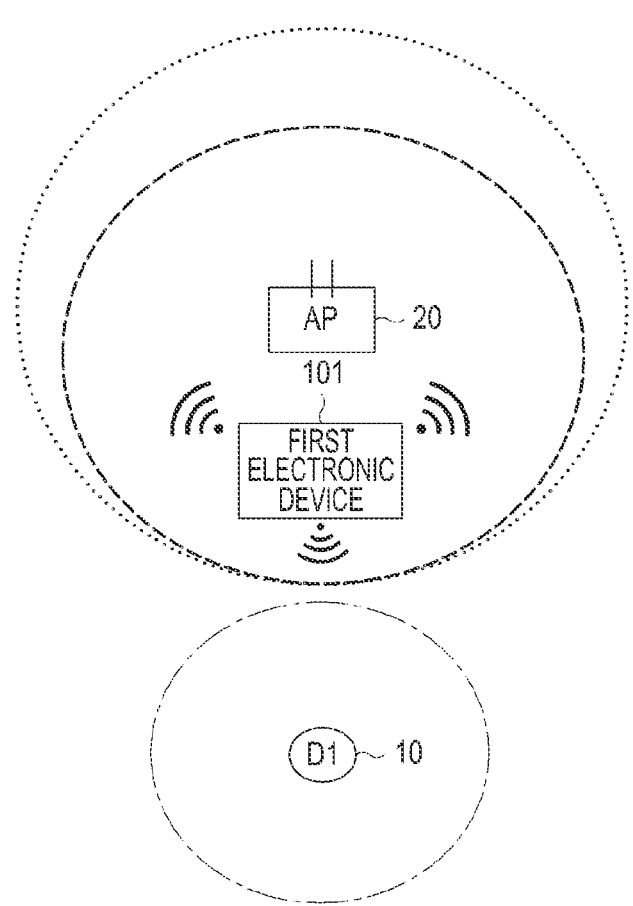
FIG. 28 is a diagram illustrating another example of transmitting collected information in an electronic device, according to various embodiments of the present disclosure.

FIG. 27 and FIG. 28 illustrate additional examples of transmitting collected information in the electronic device, according to various embodiments of the present disclosure. Referring to FIGS. 27 and 28, the first electronic device 101 may support a beam-forming technology and a multiple-input/multiple-output (MIMO) technology in order to improve the transmission efficiency by simultaneously transmitting and receiving data with multiple antennas, and may transmit one or more pieces of information by using the beam-forming technology and the MIMO technology.

The first electronic device 101 may transmit one or more pieces of information to only the area where the network actually exists by adjusting a transmission direction by using the beam-forming technology and the MIMO technology. When analyzing and/or processing the collected information, the first electronic device 101 may separate one or more pieces of the collected information for each sector (first sector, the second sector, and the third sector).

The first electronic device 101 may separate sectors (first sector, the second sectors and the third sector) by using the MIMO technology, and may be positioned to be adjacent to the second wireless access point (AP2) 20b in the second sector and the third wireless access point (AP3) 20c in the third sector by analyzing the location information of the second electronic device (D) 10. In addition, the first electronic device 101 may recognize that the first electronic device 101 may not be affected by the first wireless access point (AP1) 20a in the first sector. The first electronic device 101 may: analyze one or more pieces of information for each sector; filter one or more pieces of the information that is collected in the first wireless access point 20a; and transmit one or more pieces of the information that is collected in only the second and third wireless access points 20a and 20c.

Figure 29:
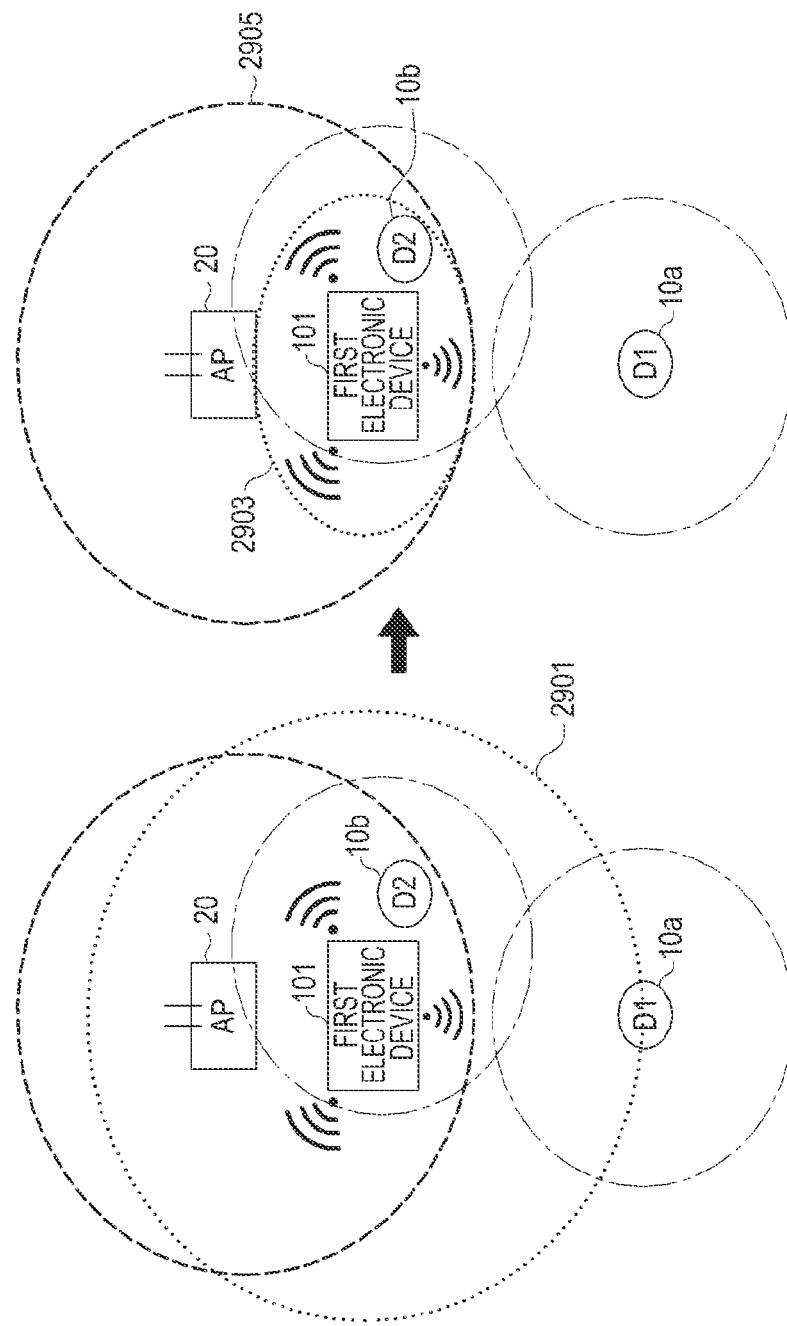
FIG. 29 is a diagram illustrating another example of transmitting collected information in an electronic device, according to various embodiments of the present disclosure.

FIG. 29 is a diagram illustrating another example of transmitting collected information in the electronic device, according to various embodiments of the present disclosure.

Referring to FIG. 29, the first electronic device 101 may transmit one or more pieces of information to the one or more second electronic devices (D1) 10a and (D2) 10b by utilizing a transmission power (TX Power) control technology.

Network information included in one or more pieces of the information, which is transmitted by the first electronic device 101, may be analyzed in order to thereby recognize that the network information is not valid in second electronic device (D1) 10a. The first electronic device 101 may analyze a distance from the wireless access point (AP) 20 by using one or more pieces of the collected information, and may transmit a transmission signal according to the analyzed distance information. That is the first electronic device 101, as shown in FIG. 29, may adjust transmission power such that the previous coverage 2901 is reduced to coverage 2903, which is located within the boundaries of actual coverage area 2905 of the wireless access point 20.

Figure 30:
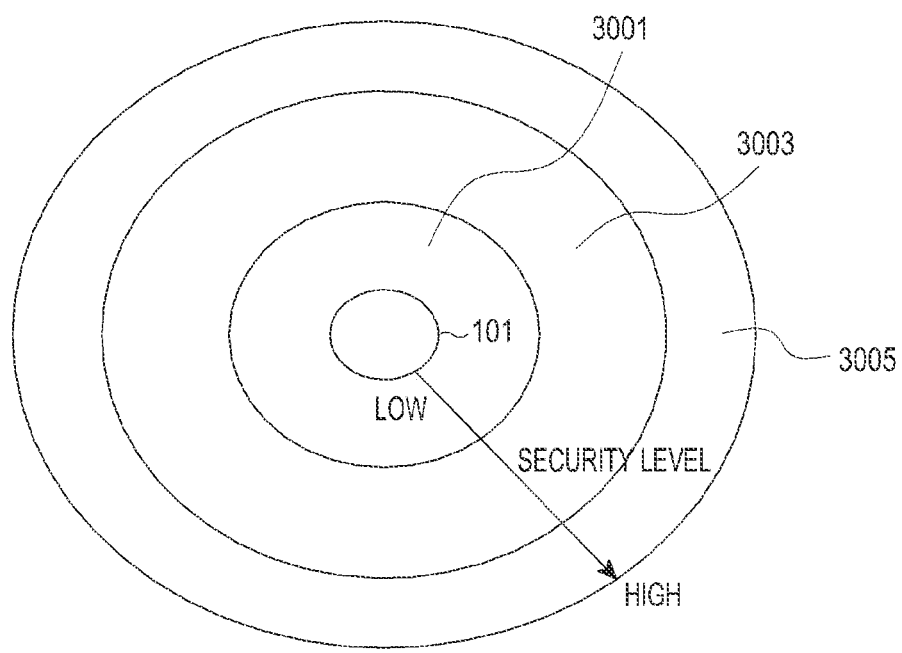
FIG. 30 is a diagram illustrating another example of transmitting collected information in an electronic device, according to various embodiments of the present disclosure.
Figure 31:
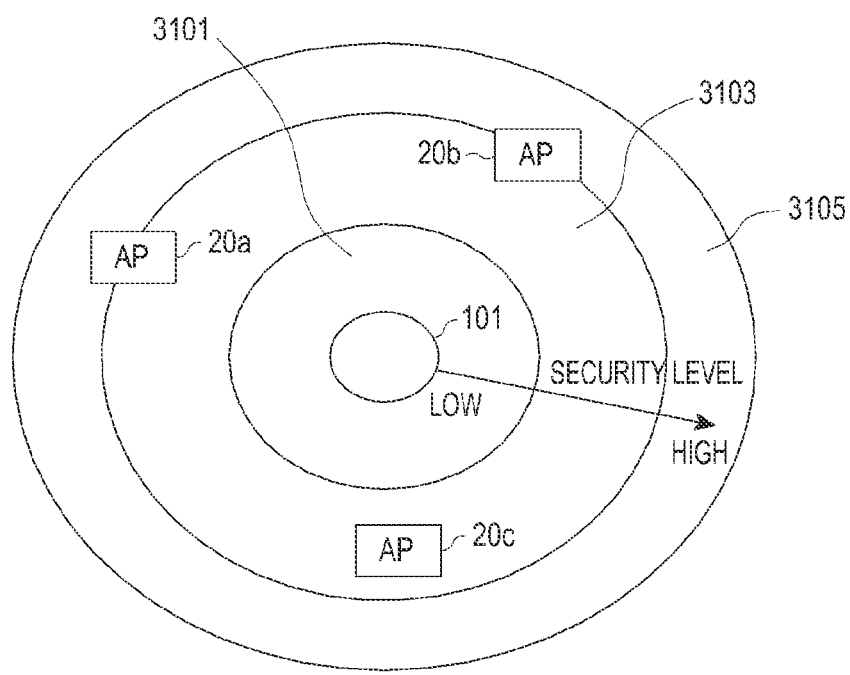
FIG. 31 is a diagram illustrating another example of transmitting collected information in an electronic device, according to various embodiments of the present disclosure.

FIG. 30 and FIG. 31 illustrate other examples of transmitting collected information in an electronic device, according to various embodiments of the present disclosure, the first electronic device 101 may transmit one or more pieces of information to second electronic devices differently by adjusting a security level of the information. Referring to FIG. 30 and FIG. 31, the first electronic device 101 may configure the security level differently according to the distance (e.g., first areas 3001 and 3101, second areas 3003 and 3103 and third areas 3005 and 310, respectively, in FIGS. 30 and 31). The first electronic device 101 may configure a lower security level when transmitting one or more pieces of information to nearby second electronic devices in the first area 3001, and may configure a higher security level when transmitting one or more pieces of information to second electronic devices in the second area 3003 or the third area 3005 that are further away from the first electronic device 101, because the first electronic device 101 may be vulnerable with respect to the second electronic devices in the second area 3003 or the third area 3005.

As shown in FIG. 31, when the current network is an enterprise-environmental network supporting APs 20a, 20b, and 20c, the first electronic device 101 may enhance the security level of the information to be transmitted to at least one the second electronic devices when transmitting information collected from the APs 20a, 20b, and 20c.

The first electronic device 101 may recognize a security level of the network, which is indicated by one or more pieces of the collected information, and may synchronize the security levels of the information to be transmitted according to the identified security level of the network.

The first electronic device 101 may transmit, to the one or more second electronic devices, one or more pieces of information that includes uniform resource locator (URL) information by which a key may be obtained in the one or more second electronic devices. The one or more second electronic devices, which have received one or more pieces of the information, may access the corresponding URL in order to thereby obtain a key to decrypt the information transmitted by the first electronic device 101. In addition, services provided by the first electronic device 101 and the one or more second electronic devices, which receive the services, may share a predetermined key value in advance.

Figure 32:
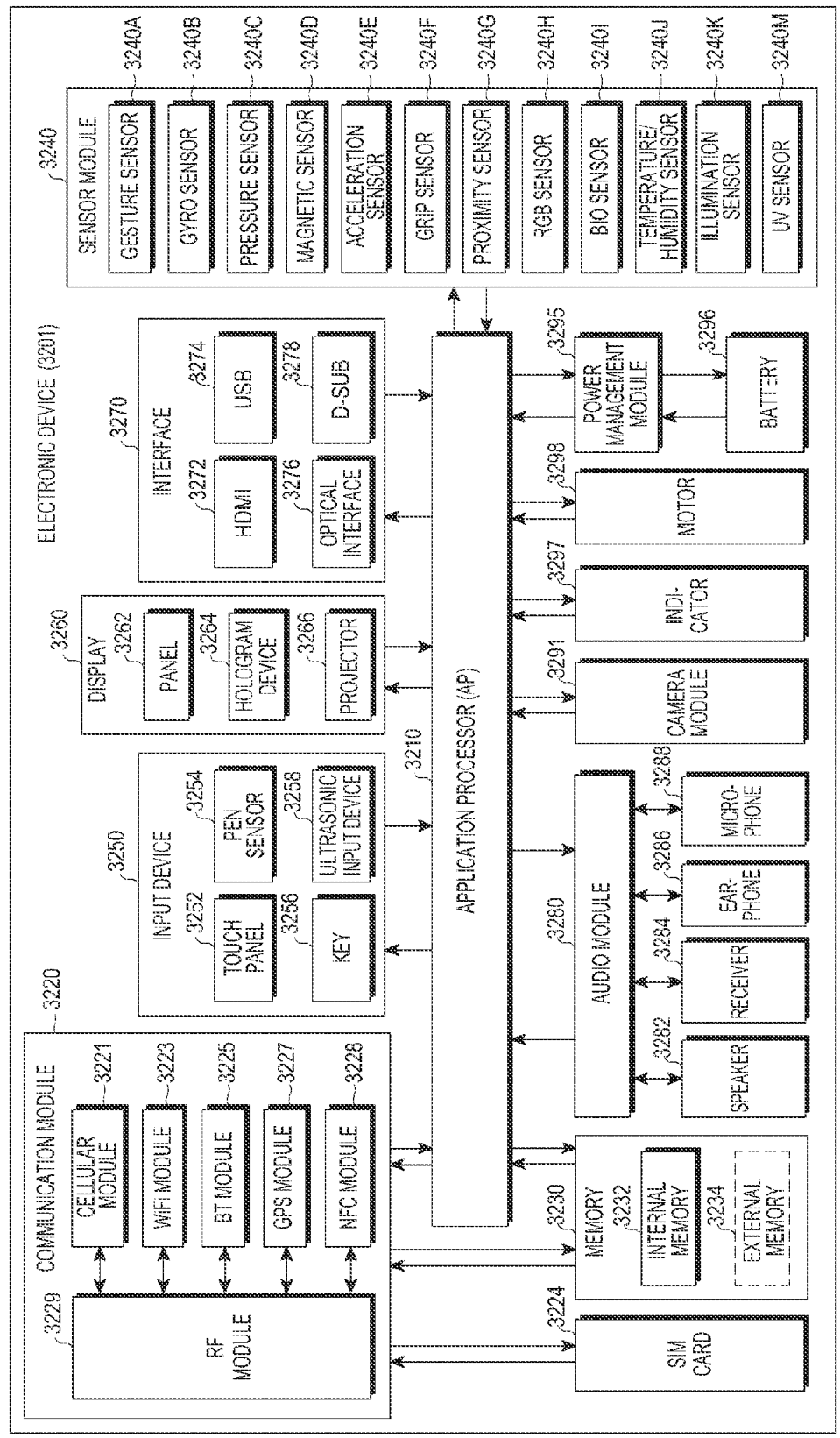
FIG. 32 is a block diagram illustrating a detailed structure of an electronic device, according to various embodiments of the present disclosure.

FIG. 32 shows a block diagram of an electronic device according to various embodiments of the present disclosure. The electronic device 3201 may form a part or all of the electronic device 101 shown in FIG. 1.

Referring to FIG. 32, the electronic device 3201 includes one or more application processors (AP) 3210, a communication module 3220, a subscriber identification module (SIM) card 3224, a memory 3230, a sensor module 3240, an input device 3250, a display 3260, an interface 3270, an audio module 3280, a camera module 3291, a power management module 3295, a battery 3296, an indicator 3297, and a motor 3298.

The one or more APs 3210 may control a plurality of hardware or software elements connected with the one or more APs 3210 and may perform data processing and calculation, by executing an operating system or application programs. The one or more APs 3210 may be implemented by, for example, systems on chip (SoCs). The one or more APs 3210 may further include a graphic processing unit (GPU) and/or an image signal processor. The one or more APs 3210 may include at least some of the elements (e.g., a cellular module 3321) shown in FIG. 32. The one or more APs 3210 may load instructions or data received from one or more of the other elements (e.g., non-volatile memories) in the volatile memory to then be processed, and may store a variety of data in non-volatile memories.

The communication module 3220 may have elements that are identical or similar to elements of the communication interface 160 of FIG. 1. The communication module 3220, for example, includes a cellular module 3221, a Wi-Fi module 3223, a BT module 3225, a GPS module 3227, an NFC module 3228, and a radio frequency (RF) module 3229.

The cellular module 3221, for example, may provide services of voice calls, video calls, and text messaging, or an Internet service through communication networks. For example, the cellular module 3221 may perform identification and authentication of the electronic device 3201 in the communication network by using subscriber identification modifies (e.g., the SIM card 3224). The cellular module 3221 may perform at least some of the functions provided by the one or more APs 3210. For example, the cellular module 3221 may include a communication processor (CP).

Each of the Wi-Fi module 3223, the BT module 3225, the GPS module 3227, and the NFC module 3228 may include a processor for processing data transmitted and received through the corresponding module. For example, at least some (e.g., more than two) of the cellular module 3221, the Wi-Fi module 3223, the BT module 3225, the GPS module 3227, or the NFC module 3228 may be contained in a single integrated chip (IC) or an IC package.

The RF module 3229, for example, may transmit and receive communication signals (e.g., RF signals). The RF module 3229 may include, for example, a transceiver, a power amp module (PAM), a frequency filter, a low noise amplifier (LNA), antennas, or the like. According to an alternative embodiment of the present disclosure, at least one of the cellular module 3221, the Wi-Fi module 3223, the BT module 3225, the GPS module 3227, or the NFC module 3228 may transmit and receive the RF signals through separate modules.

The SIM card 3224 may be a removable subscriber identification module, and/or embedded SIM, and may include inherent identification information (e.g., an integrated circuit card identifier (ICCID)) or subscriber information (e.g., an international mobile subscriber identity (IMSI)).

The memory 3230 (e.g., the memory 130), for example, may include an internal memory 3232 or an external memory 3234. The internal memory 3232 may include at least one of volatile memories {e.g., a dynamic RAM (DRAM), a static RAM (SRAM), a synchronous dynamic RAM (SDRAM), or the like}, or non-volatile memories (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, a solid state drive (SSD), or the like).

The external memory 3234 may further include a flash drive, for example, a compact flash (CF), a secure digital (SD), a micro secure digital (Micro-SD), a mini secure digital (Mini-SD), an extreme digital (xD), a memory stick, or the like. The external memory 3234 may be functionally and/or physically connected with the electronic device 3201 through various interfaces.

The sensor module 3240 may measure physical quantities and may detect an operation state of the electronic device 3201, to thereby convert the measured or detected information to electric signals. The sensor module 3240 includes at least one of, for example, a gesture sensor 3240A, a gyro-sensor 3240B, an atmospheric sensor 3240C, a magnetic sensor 3240D, an acceleration sensor 3240E, a grip sensor 3240F, a proximity sensor 3240G, a color sensor 3240H {e.g., a red-green-blue (RBG) sensor}, a bio sensor 3240I, a temperature/humidity sensor 3240J, an illuminance sensor 3240K, and an ultra violet (UV) sensor 3240M. Alternatively or additionally, the sensor module 3240 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 3240 may further include a control circuit for controlling at least one sensor included therein. The electronic device 3201 may further include a processor that is configured to control sensor module 3240, as a part of or separately from the one or more APs 3210, in order to thereby control the sensor module 3240 while the one or more APs 3210 are in a sleep mode.

The input device 3250 includes, for example, a touch panel 3252, a (digital) pen sensor 3254, keys 3256, or an ultrasonic input device 3258. The touch panel 3252 may use at least one of, for example, a capacitive type panel, a pressure sensitive type panel, an infrared type panel, or an ultrasonic type panel. In addition, the touch panel 3252 may further include a control circuit. The touch panel 3252 may further include a tactile layer in order to thereby provide a user with a tactile reaction.

The (digital) pen sensor 3254 may be implemented by using, for example, a method that is identical or similar to a user's touch input or by using a separate recognition sheet. The keys 3256 may include, for example, physical buttons, optical keys, or a keypad. The ultrasonic input device 3258 detects acoustic waves with a microphone 3288 in the electronic device 3201 through an input means that generates ultrasonic signals to thereby data.

The display 3260 (e.g., the display module 150 of FIG. 1) includes, for example, a panel 3262, a hologram device 3264, and/or a projector 3266. The panel 3262 may include identical or similar elements to the display module 150 of FIG. 1. The panel 3262 may be implemented to be, for example, flexible, transparent or wearable. The panel 3262 may be configured with the touch panel 3252 as a single module. The hologram device 3264 may display 3D images in the air by using interference of light. The projector 3266 may display images by projecting light onto a screen. The screen may be positioned, for example, inside or outside the electronic device 3201. The display 3260 may further include a control circuit for controlling the panel 3262, the hologram device 3264, or the projector 3266.

The interface 3270 includes, for example, a high-definition multimedia interface (HDMI) 3272, a universal serial bus (UBS) 3274, an optical interface 3276, and a D-sub-miniature (D-sub) 3278. The interface 3270 may be included in, for example, the communication interface 160 shown in FIG. 1. Additionally or alternatively, the interface 3270 may include, for example, a mobile high-definition link (MHL) interface, a secure digital (SD) card/multi-media card (MMC) interface or an infrared data association (IrDA) standard interface.

The audio module 3280 may convert a sound into an electric signal, and vice versa. At least some elements of the audio module 3280 may be included, for example, in the input/output interface 140 shown in FIG. 1. For example, the audio module 3280 may process voice information input or output through a speaker 3282, a receiver 3284, earphones 3286 or the microphone 3288.

The camera module 3291 is a device for photographing still and moving images, and the camera module 3291 may include at least one image sensor (e.g., a front sensor or a rear sensor), lenses, an image signal processor (ISP), or a flash (e.g., LED or a xenon lamp).

The power control module 3295 may manage the power of the electronic device 3201. The power management module 3295 may include a power management integrated circuit (PMIC), a charger integrated circuit (IC), or a battery gauge. The PMIC may use wired charging and/or wireless charging. The types of wireless charging may encompass, for example, a magnetic resonance type, a magnetic induction type, or an electromagnetic wave type, and may include additional circuits for wireless charging, such as coil loops, resonance circuits, rectifiers, or the like. The battery gauge may measure, for example, the remaining amount power of the battery 3296, a charging voltage and current, or temperature. The battery 3296 may include, for example, a rechargeable battery or a solar battery.

The indicator 3297 may display a specific state, for example, a booting state, a message state or a charging state of all or a part (e.g., the AP 3210) of the electronic device 3201. The motor 3298 may convert electric signals to a mechanical vibration, and may generate a vibration effect or a haptic effect. The electronic device 3201 may include a processing device (e.g., a GPU) for supporting mobile TV. The processing device for supporting the mobile TV may process media data according to the standard such as, for example, digital multimedia broadcasting (DMB), digital video broadcasting (DVB) or media flow.

Each of the components of the electronic device 3201 may be implemented by one or more components and the name of the corresponding component may vary depending on a type of the electronic device. According to alternative embodiments of the present disclosure, an electronic device may include at least one of the above-described elements, some of the above-described elements may be omitted from the electronic device, or the electronic device may further include additional elements. Further, some of the components of an electronic device according to an embodiment of the present disclosure may be combined to form a single entity, and thus, may execute functions equivalent to the corresponding elements prior to the combination.

Figure 33:
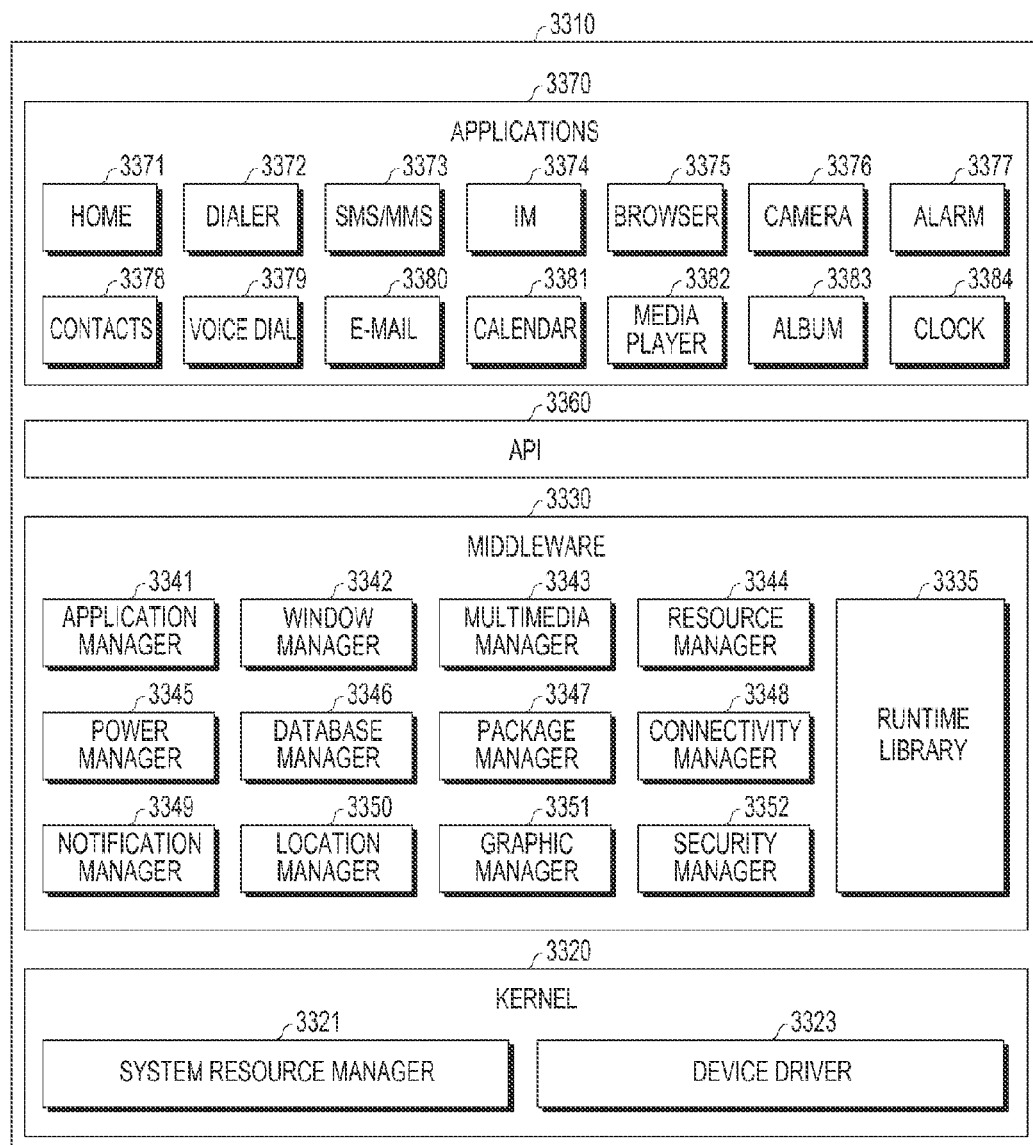
FIG. 33 is a block diagram illustrating a detailed structure of an electronic device, according to various embodiments of the present disclosure.

FIG. 33 is a block diagram of a program module, according to various embodiments of the present disclosure.

The program module 3310 (e.g., programs) includes an operating system (OS) that controls resources related to electronic device 101, and/or various application programs 137 that are executed under the OS.

The program module 3310 includes, for example, a kernel 3320, middleware 3330, an application programming interface (API) 3360, and/or applications 3370. At least some of the program module 3310 may be pre-loaded in the electronic device, or may be downloaded from the server 106.

The kernel 3320 (e.g., the kernel 131 of FIG. 1) includes, for example, a system resource manger 3321 and a device driver 3323. The system resource manger 3321 may perform a control, allocation, or collection of system resources. The system resource manager 3321 may include a process managing unit, a memory managing unit, or a file system managing unit. The device driver 3323 may include, for example, a display driver, a camera driver, a Bluetooth driver, a shared memory driver, a USB driver, a keypad driver, a Wi-Fi driver, an audio driver, or inter-process communication (IPC) driver.

The middleware 3330, for example, may provide common functions necessary for the applications 3370, or may provide the applications 3370 with various functions through the API 3360 in order for the applications 3370 to effectively use limited system resources inside the electronic device. The middle ware 3330 (e.g., the middleware 132) includes, for example, at least one of a run-time library 3335, an application manager 3341, a window manager 3342, a multimedia manager 3343, a resource manager 3344, a power manager 3345, a database manager 3346, a package manager 3347, a connectivity manager 3348, a notification manager 3349, a location manager 3350, a graphic manager 3351, and a security manager 3352.

The run-time library 3335, for example, may include a library module that a compiler uses in order to add new functions through programming language while the applications 3370 are executed. The run-time library 3335 may perform functions of the input/output management, the memory management, or arithmetic calculation.

The application manager 3341 may manage a life cycle of at least one of the applications 3370. The window manager 3342 may manage a GUI resource used in a screen. The multimedia manager 3343 may recognize formats that are necessary for reproduction of various media files, and may perform encoding or decoding of the media files using codecs corresponding to the formats. The resource manager 3344 may manage resources such as a source code of one or more applications 3370, memories, or storages.

The power manager 3345 may manage a battery or a power source in association with a basic input/output system (BIOS), and may provide power information necessary for the operation of the electronic device. The database manager 3346 may create, search, or change a database used in one or more applications 3370. The package manager 3347 may manage the installation of or update to an application distributed in the form of a package file.

The connectivity manager 3348, for example, may manage a wireless connection, such as a Wi-Fi or Bluetooth connection. The notification manager 3349 may display or notify of events, such as received massages, appointments, or proximity notifications, in a manner that does not disturb a user. The location manager 3350 may manage location information of the electronic device. The graphic manager 3351 may manage graphic effects to be provided to a user and interfaces related thereto. The security manager 3352 may provide general security functions necessary for system security or user authentication. When the electronic device 101 adopts a phone call function, the middleware 3330 may further include a telephone manager to manage a voice or video phone call function of the electronic device.

The middleware 3330 may include a middleware module that includes a combination of various functions of the above-described elements. The middleware 3330 may provide modules that are specialized according to the type of operating system in order to provide differentiated functions. In addition, the middleware may dynamically exclude some of the existing elements, or may further include new elements.

The API 3360 (e.g., the API 133), which is a group of API programming functions, may be provided to have a different configuration according to the operating system of the electronic device 101. For example, when the operating system is Android or iOS, a single API set may be provided for each platform. In the case of Tizen, two or more API sets may be provided.

The applications 3370 (e.g., the application programs 134), for example, include at least one of a home application 3371, a dialer application 3372, a short message server (SMS)/multi-media message service (MMS) application 3373, an instant message (IM) application 3374, a browser application 3375, a camera application 3376, an alarm application 3377, a contact list application 3378, a voice dial application 3379, an e-mail application 3380, a calendar application 3381, a media player application 3382, an album application 3383, a clock application 3384, a healthcare application (e.g., for measuring the amount of exercise or blood glucose), and an environmental information providing application (e.g., an application that provides atmospheric pressure information, humidity information, or temperature information).

The applications 3370 may include an application (hereinafter, referred to as "information-exchange application" for convenience of explanation) that supports the exchange of information between the electronic device 101 and the external electronic device 104. The information-exchange application may include, for example, a notification relay application for relaying specific information to external electronic devices, or a device management application for managing external electronic devices.

For example, the notification relay application may include a function of transferring notification information created in other applications (e.g., the SMS/MMS application, the e-mail application, the healthcare application, or the environmental information application) of the electronic device to the electronic devices 104. In addition, the notification relay application, for example, may receive the notification information from external electronic devices in order to provide the notification information to the user. The device management application, for example, may manage (e.g., install, delete, or update) at least some functions {e.g., turning external electronic device (or some elements) on or off, or adjusting the brightness (or resolution) of a display} of the external electronic device (e.g., the electronic device 104) that communicates with the electronic device 101, applications executed in the external electronic device, or services (e.g., a phone call service, or a messaging service) provided from the external electronic device.

The applications 3370 may include applications (e.g., the healthcare application), which are designated according to the properties (e.g., the type of electronic device, such as a mobile medical device) of the external electronic device (e.g., the electronic device 104). The applications 3370 may include applications that are received from the electronic device 104 or the server 106. The applications 3370 may include preloaded applications or third party applications that can be downloaded from the servers. The names of the components of the program module 3310 shown and described with reference to FIG. 33 may be changed according to the type of operating system.

At least a part of the programming module 3310 may be implemented in software, firmware, hardware, or a combination of two or more thereof. At least some of the programming module 3310 may be implemented (e.g., executed) by, for example, the processor (e.g., the AP 3310). At least some of the programming module 3310 may include, for example, a module, program, routine, sets of instructions, process, or the like for performing one or more functions.

The terms "module" and "functional unit" used herein may, for example, refer to a unit including at least one of hardware, software, and firmware. The "module" may be interchangeably used with, for example, the terms "unit", "logic", "logical block", "component", or "circuit". A module or function unit may be a minimum unit of an integrated component element or a part thereof. A module may be a minimum unit for performing one or more functions or a part thereof. A module or function unit may be mechanically or electronically implemented. For example, a module or function unit according to the present disclosure may include, for example, at least one of an Application-Specific Integrated Circuit (ASIC) chip, a Field-Programmable Gate Arrays (FPGA), and a programmable-logic device for performing operations which has been known or are to be developed hereinafter.

At least some of the devices (e.g., modules or functions thereof) or the methods (e.g., operations) according to embodiments of the present disclosure may be implemented by a command or instruction stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to embodiments of the present disclosure may include, for example, at least one of the above described elements, exclude some of the elements, or further include other additional elements. The operations performed by the modules, programming module, or other elements according to an embodiment of the present disclosure may be executed in a sequential, parallel, repetitive, or heuristic manner. Further, some operations may be executed according to another order or may be omitted, or other operations may be added.

According to various embodiments of the present disclosure, in a computer-readable recording medium that records a program to be executed in computers, the program may allow a processor to collect one or more pieces of information through the first communication module; and transmit one or more pieces of information related to the collected information through the second communication module that supports a low-power and short-range communication method.

The electronic device and the method for transmitting information, according to an embodiment of the present disclosure, may collect one or more pieces of information through the first communication module, and may transmit one or more pieces of information related to the collected information through the second communication module that supports one or more low-power and short-range communication methods so that a nearby electronic device, of which the first communication module is in an off-state, may receive one or more pieces of the information collected through the first communication module.

Various embodiments of the present disclosure disclosed herein are merely provided as examples to describe technical details of the present disclosure, and to help provide an understanding of the present disclosure. However, these embodiments are not intended to limit the scope of the present disclosure.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. An electronic device comprising:
   a communication device that includes a first communication module and a second communication module, wherein the second communication module supports a low-power and short-range communication method; and
   a processor configured to:
      control collection of first information through the first communication module,
      control collection of second information, wherein the second information is related to the collected first information,
      filter the collected first information using the collected second information,
      generate a plurality of data frames that include the collected second information, wherein a payload portion of each of the generated data frames includes different service identifiers and the collected second information; and broadcast the generated data frames through the second communication module.

2. The electronic device of claim 1, wherein the low-power and short-range communication method is at least one of Bluetooth low energy (BLE) beacon networking, neighbor awareness networking (NAN), near field communication (NFC), and ZigBee networking.

3. The electronic device of claim 1, wherein the first communication module supports at least one of a short-range communication method, a mobile communication method, a peer to peer (P2P) communication method, a device access method, and a user input method.

4. The electronic device of claim 1, wherein the collected second information includes at least one of information stored in at least one of a storage medium of the electronic device, information measured in the electronic device, running service information of the electronic device, running application information of the electronic device, and information collected according to a predetermined condition.

5. The electronic device of claim 1, wherein the generated data frames are assigned the same service identifier if the data generated frames include information related to each other, and are transmitted through different low-power and short-range communication interfaces included in the second communication module.

6. The electronic device of claim 1, wherein the processor differently generates the data frames, which include the collected second information, depending on at least one of hierarchical modulation, frequency, distance, and low-power and short-range communication methods, and the generated data frames are transmitted through the second communication module.

7. The electronic device of claim 1, wherein the processor differently generates the data frames according to at least one of ambient conditions of the electronic device, time, place, and another specific condition, and each of the generated data frames is transmitted through the second communication module.

8. The electronic device of claim 1, wherein the processor is further configured to separate the collected first information for each of a plurality of sectors, and information that is separated for each sector is transmitted through the second communication module.

9. The electronic device of claim 8, wherein the processor is further configured to limit at least one sector in which networks exist by adjusting a signal transmission direction, and transmit information corresponding to the at least one limited sector through the second communication module.

10. The electronic device of claim 1, wherein, when the first communication module supports the short-range communication method, the processor is further configured to collect network information provided via a wireless access point, analyze and process the collected network information, and transmit the analyzed and processed information through the second communication module.

11. The electronic device of claim 1, wherein, when the first communication module is a communication module configured to be connected with at least one service device, the processor is further configured to collect venue information and service information provided by the at least one connected service device, analyze and process the collected venue information and service information, and transmit the analyzed and processed information through the second communication module.

12. The electronic device of claim 1, wherein, when the first communication module supports communication between a plurality of electronic devices, the processor is further configured to collect information from among at least one of network-related information, device status information, and device location information, which is provided by other electronic devices, process the collected information, and transmit the processed information through the second communication module, and wherein the processed information includes information for location estimation of the other electronic devices and network correction information.

13. The electronic device of claim 1, wherein, when the first communication module supports a mobile communication method, the processor is further configured to collect network-related information provided by a mobile communication access point, analyze and process the collected information, and transmit the analyzed and processed information through the second communication module, and wherein the analyzed and processed information includes at least one of recommended network-related information and policy information.

14. The electronic device of claim 1, wherein, when the first communication module supports a peer to peer (P2P) communication method, the processor is further configured to collect information provided by at least one nearby electronic device that is connected through the first communication module, analyze the collected information, and transmit nearby electronic device-related information through the second communication module.

15. The electronic device of claim 1, wherein the processor, when another electronic device that has received transmitted information requests additional information, is further configured to transmit the additional information received from connected nearby electronic devices to another electronic device through the first communication module.

16. The electronic device of claim 1, wherein the processor is further configured to analyze the collected first information, register the analyzed information in a service device that is connected through the first communication module, and receive the analyzed information using the information registered in the service device through the first communication module.

17. The electronic device of claim 1, wherein the processor is further configured to receive, through the second communication module, feedback for the collected second information transmitted through the second communication module.

18. A method of transmitting information in an electronic device, the method comprising:

collecting first information through a first communication module;

collecting second information, wherein the second information is related to the collected first information;

filtering the collected first information using the collected second information; and transmitting the collected second information through a second communication module that supports a low-power and short-range communication method, wherein transmitting the collected second information through the second communication module comprises broadcasting a plurality of data frames, which are generated by different service identifiers, and wherein a payload portion of each of the plurality of data frames includes the different service identifiers and the collected second information.

19. The method of claim 18, wherein the low-power and short-range communication method is at least one of Bluetooth low energy (BLE) beacon networking, neighbor awareness networking (NAN), near field communication (NFC), and ZigBee networking.

20. The method of claim 18, further comprising:
analyzing the collected first information by using the collected second information, wherein the collected second information is at least one of information stored in a storage medium of the electronic device, information measured in the electronic device, running service information of the electronic device, running application information of the electronic device, and information that is collected according to a predetermined condition;
generating at least one data frame that includes the collected second information according to the analysis result; and
configuring the second communication module according to the generated at least one data frame.

21. The method of claim 18, wherein collecting the first information and the second information through the first communication module comprises collecting information through the first communication module using at least one of a short-range communication method, a mobile communication method, a peer to peer (P2P) communication method, a device access method, and a user input method.

22. The method of claim 18, wherein collecting information through the first communication module comprises collecting information stored in at least one of a storage medium of the electronic device, information measured in the electronic device, running service information of the electronic device, running application information of the electronic device, and information that is collected according to a predetermined condition.

23. The method of claim 18, wherein transmitting the collected second information through the second communication module comprises transmitting information that is differently configured according to at least one of hierarchical modulation, frequency, distance, and low-power and short-range communication methods.

24. The method of claim 18, wherein transmitting the collected second information through the second communication module comprises transmitting information that is differently configured according to at least one of ambient conditions of the electronic device, time, place, and a specific condition through the second communication module.

25. The method of claim 18, wherein transmitting the collected second information through the second communication module comprises separating information related to the collected first information for each of a plurality of sectors, and transmitting the collected second information for each sector through the second communication module.

26. The method of claim 18, wherein transmitting the collected second information through the second communication module comprises limiting at least one sector in which networks exist by adjusting a signal transmission direction, and transmitting information related to the collected first information corresponding to the at least one limited sector through the second communication module.

27. The method of claim 18, wherein transmitting the collected second information through the second communication module comprises transmitting the plurality of data frames, which are generated by adding synchronization information to the collected second information, in different low-power and short-range communication methods.

28. The method of claim 18, further comprising, when another electronic device that has received the transmitted information requests additional information, transmitting the additional information received from a connected nearby peer to peer (P2P) device to another electronic device through the first communication module.

29. The method of claim 18, further comprising:
analyzing the collected first information;
registering the analyzed information in a service device that is connected through the first communication module; and
receiving the analyzed information using the information registered in the service device through the first communication module.

30. The method of claim 18, further comprising receiving, through the second communication module, feedback for the collected second information transmitted through the second communication module.

31. A non-transitory computer-readable recording medium that records a program, which when executed by a processor allows the processor to perform a method comprising:
collecting first information through a first communication module;
collecting second information, wherein the second information is related to the collected first information;
filtering the collected first information using the collected second information; and
transmitting the collected second information through a second communication module that supports a low-power and short-range communication method,
wherein transmitting the collected second information through the second communication module comprises broadcasting a plurality of data frames, which are generated by different service identifiers, and
wherein a payload portion of each of the plurality of data frames includes the different service identifiers and collected second information.

* * * * *